US011649383B2

(12) United States Patent
Zhao et al.

(10) Patent No.: US 11,649,383 B2
(45) Date of Patent: May 16, 2023

(54) ADHESIVE COMPOSITION

(71) Applicant: UNIVERSITY OF LIMERICK, Limerick (IE)

(72) Inventors: Bin Zhao, Limerick (IE); Conor McCarthy, Limerick (IE)

(73) Assignee: UNIVERSITY OF LIMERICK, Limerick (IE)

( * ) Notice: Subject to any disclaimer, the term of this patent is extended or adjusted under 35 U.S.C. 154(b) by 1018 days.

(21) Appl. No.: 16/313,622

(22) PCT Filed: Jun. 27, 2017

(86) PCT No.: PCT/EP2017/065876
§ 371 (c)(1),
(2) Date: Dec. 27, 2018

(87) PCT Pub. No.: WO2018/002064
PCT Pub. Date: Jan. 4, 2018

(65) Prior Publication Data
US 2019/0241772 A1 Aug. 8, 2019

(30) Foreign Application Priority Data
Jun. 27, 2016 (GB) .................................... 1611165

(51) Int. Cl.
*C09J 11/04* (2006.01)
*C09J 163/00* (2006.01)
(Continued)

(52) U.S. Cl.
CPC ................. *C09J 11/04* (2013.01); *C09J 9/02* (2013.01); *C09J 163/00* (2013.01); *C08K 3/042* (2017.05);
(Continued)

(58) Field of Classification Search
None
See application file for complete search history.

(56) References Cited

U.S. PATENT DOCUMENTS

| 5,159,865 A | 11/1992 | Hinckley |
| 2005/0236107 A1* | 10/2005 | Doi ........................... C09J 7/22 438/464 |

(Continued)

FOREIGN PATENT DOCUMENTS

| JP | H061955 A | 1/1994 |
| JP | H11263943 A | 9/1999 |

(Continued)

OTHER PUBLICATIONS

Hardiman et al., "Fibrous composite matrix characterisation using nanoindentation: The effect of fibre constraint and the evolution from bulk to in-situ matrix properties," Elsevier, Composites: Part A, 68, 2015, 296-303.

(Continued)

*Primary Examiner* — Daniel McNally
(74) *Attorney, Agent, or Firm* — Hoffman Warnick LLC

(57) ABSTRACT

An adhesive composition degradable by dielectric heating. The adhesive composition comprises a thermosetting polymer and a material sensitive to dielectric heating. The material sensitive to dielectric heating is selected from any one or more of hollow nanospheres, nanotubes, nanorods, nanofibres, nanosheets, graphene, graphene derivatives, nano/micro hybrids and mixtures of two or more nanoscale particles. The adhesive composition may be particularly useful in the assembly and disassembly of parts, particularly parts which have complicated and/or blocked joined surfaces. A method of joining at least two parts of an article together and a method of disassembling at least two parts of an article, using the adhesive composition are also provided. The adhesive composition may provide a reworkable nano- (Continued)

composite adhesive. The adhesive composition may be used to reversibly bond a biomedical or dental implant to a part of a human or animal body.

3 Claims, 11 Drawing Sheets

(51) Int. Cl.
| | | |
|---|---|---|
| *C09J 9/02* | (2006.01) | |
| *C08K 3/04* | (2006.01) | |
| *C08K 3/22* | (2006.01) | |
| *C08K 7/06* | (2006.01) | |
| *C08K 7/24* | (2006.01) | |

(52) U.S. Cl.
CPC ............... *C08K 3/22* (2013.01); *C08K 7/06* (2013.01); *C08K 7/24* (2013.01); *C08K 2003/2275* (2013.01); *C08K 2201/001* (2013.01); *C08K 2201/005* (2013.01); *C09J 2301/314* (2020.08); *C09J 2301/412* (2020.08); *C09J 2301/502* (2020.08)

(56) References Cited

U.S. PATENT DOCUMENTS

| | | |
|---|---|---|
| 2006/0289113 A1 | 12/2006 | Cura et al. |
| 2010/0300159 A1* | 12/2010 | Berg .................. C09J 163/00 252/511 |
| 2015/0328847 A1 | 11/2015 | Kia et al. |
| 2016/0015652 A1 | 1/2016 | John et al. |

FOREIGN PATENT DOCUMENTS

| | | |
|---|---|---|
| JP | 2007084767 A | 4/2007 |
| JP | 2010006908 A | 1/2010 |
| JP | 2010173265 A | 8/2010 |
| WO | 2009147415 A1 | 12/2009 |
| WO | 2011023430 A1 | 3/2011 |

OTHER PUBLICATIONS

PCT International Search Report and Written Opinion for International Application No. PCT/EP2017/065876, dated Dec. 12, 2017, 17 pages.

Great Britain Search Report for Application No. GB1611165.0, dated Oct. 24, 2016, 5 pages.

* cited by examiner

ADHESIVE COMPOSITION

FIELD

The present invention relates to an adhesive composition, a method of joining at least two parts of an article together, a method of disassembling at least two parts of an article which are joined by a cured adhesive composition and an article comprising a join. In particular the invention relates to adhesive compositions comprising particles susceptible to dielectric heating for reversibly joining parts/components of articles together.

BACKGROUND

There are several conventional techniques used in industry to create a bond between parts or components of mechanical/electrical equipment and infrastructure. These conventional techniques include welding, riveting, screwing, etc. Such mechanical fastening methods have been preferred by designers and engineers but can be very inefficient and expensive, for example there can be over a million fasteners in a commercial passenger aircraft. Therefore, there is a need to develop more efficient joining techniques.

Adhesives have been used as an alternative to mechanical fastening to join parts or components together. Joining composite materials to metals is likely to become more important as new high performance hybrid structures are developed such as light-weight aircraft, electric cars, ship hulls and wind/wave energy turbine blades formed from or containing parts formed from composite materials. However, it can be difficult to join composite materials to metals using adhesives, due mainly to a significant mismatch in their thermal expansion coefficients and their vastly different surface chemistries, which makes bonding very difficult. Therefore, there is a need to develop more efficient joining techniques which are suitable for composite materials.

Adhesives comprising a thermosetting resin (termed "thermosetting adhesives") form on curing a highly cross-linked 3-dimensional polymer structure. This highly cross-linked structure produced by chemical bonds in the thermosetting resin provides high mechanical and physical strength (to support high stress or load) and high stability (to resist degradation by temperature, weather, aging, water and solvents) compared with thermoplastic polymers. Additionally, thermosetting adhesives are generally modified by the addition of elastomer, rubber, thermoplastic polymer and copolymer in order to enhance the impact stress and peel strength. Thermosetting adhesives are therefore considered to be promising alternatives to conventional joining technology. Bonding using thermosetting adhesives may provide the following advantages:

1) a reduction in the number of machine components such as screws, nuts, washers and rivets that are necessary for the joining process, which can reduce the manufacturing cost of the overall joining process;

2) an improvement in stress distribution, in which the stresses are homogeneously distributed over the entire bonding area thereby minimizing high localized stress concentrations, in order to enhance the fatigue resistance to mechanical shock and vibration upon prolonged exposure to hostile environmental conditions;

3) an improvement in humidity and corrosion resistance at both ambient and elevated temperature conditions;

4) a more convenient method to join substrates with different geometries, sizes and composition (such as wood, plastic, metal, glass, composites);

5) a reduction of the product weight which is particularly important in the development of more energy efficient vehicles (cars, ships, trains etc).

SUMMARY OF THE INVENTION

It is very difficult to disassemble parts joined by thermosetting adhesives in order to recycle, replace and/or repair said parts. The disassembly or "unzipping" of the parts joined by a thermosetting adhesive is difficult due to the thermosetting adhesive's high adhesive strength, excellent mechanical performance, high chemical/physical properties and high resistance to melting. The thermosetting adhesive could be widely used for the replacement, recycle, repair and maintenance operations in several core industrial fields such as aviation, aerospace, automobile, railway vehicle, machinery, military, chemical engineering, electrical and electronics, if the joined parts could be easily separated without damage.

Known methods for disassembling parts joined by thermosetting adhesives include mechanical cutting using saws, scissors, blades or lasers. For example, U.S. Pat. No. 5,159,865 discloses a method of disassembling parts joined by thermosetting adhesives using an electrically heated vibration blade.

It is one aim of the present invention, amongst others, to provide an adhesive composition which addresses at least one disadvantage of the prior art, whether identified here or elsewhere, or to provide an alternative to existing adhesives. For instance it may be an aim of the present invention to provide an adhesive composition which can form a join between at least two parts of an article and which facilitates the disassembly of the at least two parts without damaging the parts.

According to aspects of the present invention, there is provided an adhesive composition, a method of joining at least two parts of an article together, a method of disassembling at least two parts of an article which are joined by a cured adhesive composition and an article comprising a join, as set forth in the appended claims. Other features of the invention will be apparent from the dependent claims, and the description which follows.

According to a first aspect of the present invention, there is provided an adhesive composition comprising a thermosetting resin and particles susceptible to dielectric heating; wherein the particles susceptible to dielectric heating are selected from any one or more of hollow nanospheres, nanotubes, nanofibres, nanosheets, graphene, graphene derivatives, nano/micro hybrids and mixtures of two or more nanoscale particles.

The particles susceptible to dielectric heating may also be nanorods, suitably carbon nanorods. In some circumstances, the terms nanofibres and nanorods may be used interchangeably.

The adhesive composition may be additionally or alternatively defined as a thermosetting adhesive composition. Suitably the adhesive composition produces on curing a thermoset polymer.

By thermosetting resin we mean to refer to a compound or mixture of compounds which when part of a suitable composition can produce on curing a thermoset polymer. The thermosetting resin may be provided by or comprise monomers and/or prepolymers which transform by reaction with a curing agent to provide a thermoset polymer. A thermoset polymer is a three-dimensional polymeric material which cannot be melted and re-shaped and suitably decomposes before melting.

Suitable thermosetting resins may be suitable for use as one-part thermosetting adhesives or two-part thermosetting adhesives. One-part thermosetting adhesives typically comprise monomers and/or prepolymers and a latent curing agent. The latent curing agent may allow curing of the one-part thermosetting adhesives on exposure to particular conditions, for example atmospheric moisture and/or heat.

Two-part thermosetting adhesives are typically provided as two separate compositions which are combined in use to produce a thermoset polymer. Suitably a two-part thermosetting adhesive comprises a thermosetting resin in a first composition and a curing agent in a second composition, wherein mixing the first composition and the second composition initiate a curing reaction between the thermosetting resin and the curing agent. Typically the first and second compositions are termed parts A and B (interchangeably) of a thermosetting adhesives.

Suitable one-part or two-part thermosetting adhesives may comprise one or more thermosetting resins selected from epoxy resin, aldehyde resin, silicone resin, polyamine resin, furan resin, polybenzimidazole and unsaturated polyester.

In embodiments wherein the thermosetting resin is intended for use as a two-part thermosetting adhesive, the adhesive composition of this first aspect can be considered to be a two-part adhesive composition, suitably a two-part thermosetting adhesive composition, wherein a first composition of the two-part adhesive composition comprises one or more thermosetting resins and a second composition of the two-part adhesive composition comprises a curing agent.

The adhesive composition of this first aspect comprises particles susceptible to dielectric heating. By particles susceptible to dielectric heating we mean to refer to particles which absorb electromagnetic radiation and convert said electromagnetic radiation to heat. For example, the particles susceptible to dielectric heating may absorb radio frequency radiation and/or microwave radiation and convert said radiation to heat. Suitably the particles susceptible to dielectric heating absorb electromagnetic radiation and convert said electromagnetic radiation to heat to a greater extent than the thermosetting resin and/or a thermoset polymer produced by curing of the thermosetting resin. Suitably the particles susceptible to dielectric heating absorb electromagnetic radiation and convert said electromagnetic radiation to heat to a sufficient extent to heat and subsequently decompose a thermoset polymer produced by curing of the thermosetting resin.

The particles susceptible to dielectric heating are selected from any one or more of hollow nanospheres, nanotubes, nanofibres, nanosheets, graphene, graphene derivatives and nano/micro hybrids. The particles susceptible to dielectric heating may also be nanorods, suitably carbon nanorods. These particles may be alternatively or additionally defined as low dimensional particles, for example particles with at least one nanoscale dimension or component. For the avoidance of doubt, these terms are not intended to include nanoscale powders and/or particles which are not hybrid materials or mixtures of nanoscale powders (i.e. comprise more than one material).

The inventors have found that the adhesive compositions of this first aspect can provide advantageous thermoset polymers after curing which can be efficiently degraded/decomposed by electromagnetic radiation through dielectric heating.

Without being bound by theory, it is believed that in a dielectric heating process, the particles susceptible to dielectric heating comprised in a thermoset polymer produced on curing of the adhesive composition act as local "hotspots" which absorb the electromagnetic energy and then conduct heat into the surrounding polymer, degrading or burning it. Therefore the chains of said cross-linked thermoset polymer are decomposed at high temperature around the local "hotspots", significantly reducing the structural integrity of said thermoset polymer.

When said dielectric heating is carried out on a thermoset polymer produced by curing the adhesive composition of this first aspect which joins two parts together, for example metal component parts of a structure or article, the degradation of said thermoset polymer facilitates the disassembly and separation of the two parts by significantly reducing the structural integrity of the join. The adhesive composition may therefore be used to effectively join at least two parts together and efficiently disassemble said parts using electromagnetic radiation. Each of the at least two parts may be individually formed from or comprise any one or more of the following materials: ceramics, glass, woods, plastics, rubber, cement, stone, metals and composite materials.

The joining and disassembly of said at least two parts provided by the adhesive composition of this first aspect may be particularly advantageous for large scale and high volume operations, especially for disassembling inner, complicated and/or blocked surfaces of parts, which may decrease the potential for damage of said parts. This joining and disassembly may be widely used for the replacement, recycling, repair and maintenance of parts in different fields and industries including aviation, aerospace, automobile, railway vehicle, machinery, military, chemical engineering, electrical and electronics, construction and consumable goods.

The joining and disassembly of said at least two parts provided by the adhesive composition of this first aspect may be particularly advantageous in biomedical and dentistry applications. For example, the adhesive composition of this first aspect could be used in dentistry to affix veneers which can then be removed at a later stage by exposing the adhesive composition to suitable electromagnetic radiation. Also the adhesive composition of this first aspect may allow biomedical implants affixed using the adhesive composition to be removed and/or replaced when necessary.

The presence of the particles susceptible to dielectric heating in the adhesive composition of this first aspect may provide the additional advantage of increasing the strength of a join (or bond) between at least two parts of an article provided by the adhesive composition after curing, compared to the strength of a join provided by a similar adhesive composition not comprising the particles susceptible to dielectric heating. Suitably the particles susceptible to dielectric heating increase the tensile shear strength of such a join compared to a similar adhesive composition not comprising the particles susceptible to dielectric heating, suitably by at least 10%, suitably at least 20%.

THERMOSETTING RESIN

Figure 1:
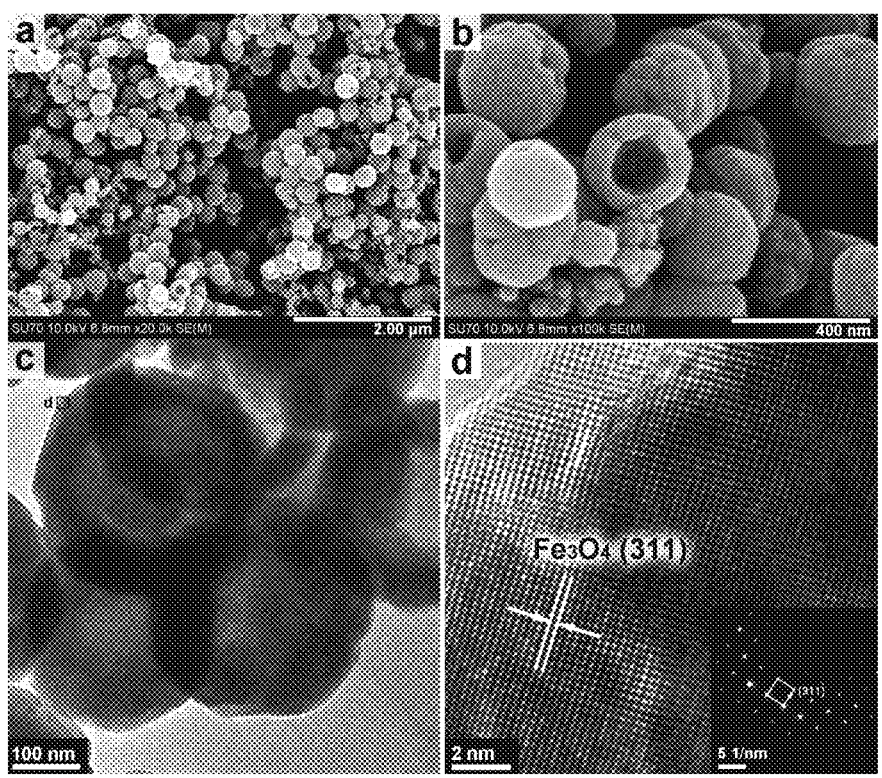
FIG. 1 shows images of products according to the invention. Panel A is a FESEM image. Panel b is a magnified FESEM image. Panel c is a TEM image. Panel d is a magnified HRTEM image.

The adhesive composition of this first aspect comprises a thermosetting resin. Suitably the thermosetting resin comprises any one or more of the following: epoxy resin, aldehyde resin, silicone resin, polyamine resin, furan resin, polybenzimidazole and unsaturated polyester. Suitably the thermosetting resin comprises modified resins derived from the above resins.

Suitably the thermosetting resin is provided by one or more of the following: epoxy resin, aldehyde resin, silicone resin, polyamine resin, furan resin, polybenzimidazole and unsaturated polyester. Suitably the thermosetting resin is provided by modified resins derived from the above resins.

Suitably the thermosetting resin consists essentially of one or more of the following: epoxy resin, aldehyde resin, silicone resin, polyamine resin, furan resin, polybenzimidazole and unsaturated polyester. Suitably the thermosetting resin consists essentially of modified resins derived from the above resins.

Suitably the thermosetting resin comprises an epoxy resin. Suitably the thermosetting resin is provided by an epoxy resin. Suitably the thermosetting resin consists essentially of an epoxy resin. Suitably the epoxy resin comprises any one or more of bisphenol A, bisphenol F, bisphenol S, bisphenol P, halogenated bisphenol A, halophenol F, hydroxymethyl bisphenol A, novolac resins and glycidyl ethers of aliphatic or cycloaliphatic diols.

Suitably the epoxy resin is a modified epoxy resin selected from any one or more of polyurethane modified epoxy resin, isocyanate modified epoxy resin, polysulfone modified epoxy resin, phenolic modified epoxy resin, nylon modified epoxy resin, polysulfide rubber modified epoxy resin, nitrile modified epoxy resin, silicone modified epoxy resin and acrylic epoxy resin.

In some embodiments, the thermosetting resin comprises an aldehyde resin or a modified aldehyde resin. Suitably the thermosetting resin is provided by an aldehyde resin or a modified aldehyde resin. Suitably the thermosetting resin consists essentially of an aldehyde resin or a modified aldehyde resin. Suitably the aldehyde resin or the modified aldehyde resin is selected from any one or more of phenolic resin, urea-formaldehyde resin, melamine modified phenolic resin and melamine modified urea-formaldehyde resin.

In some embodiments, the thermosetting resin comprises a polyamine resin or a modified polyamine resin. Suitably the thermosetting resin is provided by a polyamine resin or a modified polyamine resin. Suitably the thermosetting resin consists essentially of a polyamine resin or a modified polyamine resin. Suitably the polyamine resin or modified polyamine resin is selected from polyamide and phenolic modified polyamide.

Suitably the thermosetting resin is provided by a combination of more than one thermosetting resin, suitably as defined above.

Suitably the adhesive composition of this first aspect comprises the thermosetting resin in an amount of at least 15 wt %, suitably at least 20 wt %, suitably at least 25 wt %, suitably at least 30 wt %, suitably at least 35 wt %.

Suitably the adhesive composition of this first aspect comprises the thermosetting resin in an amount of up to 65 wt %, suitably up to 60 wt %, suitably up to 55 wt %, suitably up to 50 wt %.

Suitably the adhesive composition of this first aspect comprises the thermosetting resin in an amount of from 20 wt % to 60 wt %, suitably from 25 wt % to 55 wt %, suitably from 30 wt % to 50 wt %.

Suitably the above amounts of thermosetting resin apply to a one-part adhesive composition and to a two-part adhesive composition when each of the two parts are considered together for calculating the % wt of the different components including the thermosetting resin.

Particles Susceptible to Dielectric Heating

The adhesive composition of this first aspect comprises particles susceptible to dielectric heating which are selected from any one or more of hollow nanospheres, nanotubes, nanofibres, nanosheets, graphene, graphene derivatives and nano/micro hybrids. The particles susceptible to dielectric heating may also be nanorods, suitably carbon nanorods.

Suitably the particles susceptible to dielectric heating have a crystalline structure, phase composition, particle size and/or morphology which enhances the electromagnetic absorption and heat transfer performance and therefore dielectric heating susceptibility of these particles.

Suitably the particles susceptible to dielectric heating are low dimensional particles, suitably particles with at least one nanoscale dimension or component.

Suitably the particles susceptible to dielectric heating are nanoscale particles. Suitably the particles susceptible to dielectric heating have a particle size in the range of 50 nm to 1,000 nm (measured by transmission electron microscopy (TEM) using standard techniques).

Suitably the particles susceptible to dielectric heating are microscale particles. Suitably the particles susceptible to dielectric heating have a particle size in the range of 1 µm to 20 µm (measured by scanning electron microscopy (SEM) using standards techniques).

Suitably the particles susceptible to dielectric heating are hollow nanospheres. Suitably the particles susceptible to dielectric heating are hollow nanospheres of $Fe_3O_4$, $Co_3O_4$, ZnO, Co/Ni alloy or carbon. Suitably the particles susceptible to dielectric heating are hollow nanospheres of $Fe_3O_4$. Suitably the particles susceptible to dielectric heating are hollow nanospheres of ferrite. Suitably the hollow nanospheres have an outer shell with a thickness of from 10 nm to 100 nm, suitably from 30 nm to 60 nm, and/or a diameter of from 150 nm to 2,000 nm, suitably from 200 nm to 300 nm.

Suitably the particles susceptible to dielectric heating are carbon nanofibres, carbon nanotubes or carbon nanorods.

Suitably the particles susceptible to dielectric heating are nano/microscale hybrid particles. For example a combination of nanofibres and hollow nanospheres, suitably a combination of carbon nanofibres and $Fe_3O_4$ hollow nanospheres.

Suitably the particles susceptible to dielectric heating are graphene or a graphene derivative. Suitably the particles susceptible to dielectric heating are graphene oxide, suitably reduced graphene oxide. Suitably the graphene or graphene derivative has a sheet length of from 10 nm to 200 nm, suitably 50 nm to 150 nm.

Suitably the particles susceptible to dielectric heating are mixtures of two or more nanoscale particles, suitably which exhibit primary-secondary aggregation morphology, which may otherwise be known as hierarchical morphology, in which larger aggregates are assembled from smaller morphological units. For example the mixture of two or more nanoscale particles may be a mixture of nanoscale particles, suitably a powder, of graphene and nanoscale particles, suitably a powder, of ferrite.

Suitably the mixture of two or more nanoscale particles comprises first nanoscale particles and second nanoscale particles wherein the first nanoscale particles have a smaller particle size than the second nanoscale particles. For example, the mixture of two or more nanoscale particles may comprise "flower-like" clusters of from 1 to 5 μm in size assembled by nanosheets with a sheet thickness of from 5 to 100 nm.

The particles susceptible to dielectric heating may be nano/micro hybrids. By nano/micro hybrids we mean particles comprising a first component which has a nanoscale dimension and a second component which has a microscale dimension. The first and second components may be formed from different elements or compounds. For example, a nano/micro hybrid may be a mesoporous ferrite/carbon mixture, suitably comprising mesoporous ferrite microparticles, suitably having a particle size of from 1 to 5 μm, comprising pores having a pore size of from 2 to 50 nm and a coating layer of carbon having a thickness of from 3 nm to 10 nm. For example, the nano/micro hybrids may be ferrite "flower-like" clusters with a size of from 2 to 3 μm assembled by ferrite nanosheets with a thickness of from 10 to 50 nm, and/or may be Ni/Co nanoparticles with a size of from 2 to 10 nm attached on a surface of ferrite nanosheets.

The particles susceptible to dielectric heating may be provided by a mixture of any one of more of the particles susceptible to dielectric heating defined above.

In some embodiments wherein the particles susceptible to dielectric heating are provided by nanofibres/nanorods, suitably carbon nanofibres/nanorods. The nanofibres/nanorods may be chemically modified. For example, the nanofibres/nanorods may be modified by oxidation and optionally subsequent reaction with silane groups.

The particles susceptible to dielectric heating may be present in the adhesive composition of this first aspect in an amount of up to 40 wt %, suitably up to 30 wt %, suitably up to 20 wt %, suitably up to from 10 wt %, suitably up to 5 wt %, suitably up to 2 wt %.

The particles susceptible to dielectric heating may be present in the adhesive composition of this first aspect in an amount of at least 0.01 wt %, suitably at least 0.02 wt %, suitably at least 0.1 wt %.

The particles susceptible to dielectric heating may be present in the adhesive composition of this first aspect in an amount of from 0.01 wt % to 40 wt %, suitably from 0.01 wt % to 20 wt %, suitably from 0.01 wt % to 10 wt %, suitably from 0.01 wt % to 2 wt %.

Suitably the above amounts of particles susceptible to dielectric heating apply to a one-part adhesive composition and to a two-part adhesive composition when each of the two parts are considered together for calculating the % wt of the different components including the particles susceptible to dielectric heating.

In embodiments wherein the adhesive composition of this first aspect is a two-part adhesive composition, the particles susceptible to dielectric heating may be present in either or both of the two compositions of the two-part adhesive composition.

The particles susceptible to dielectric heating may provide the additional advantage of improving the mechanical and/or thermal properties and/or decreasing shrinkage of a cured adhesive composition produced by the adhesive composition of this first aspect on curing.

Curing Agent

Suitably the adhesive composition comprises a curing agent. Curing agents react with the thermosetting resin to produce a cross-linked 3-dimensional thermoset polymer structure.

Suitably the curing agent is selected from any one or more of amine type curing agents, anhydride type curing agents and imidazole type curing agents.

Suitably the curing agent is an amine type curing agent selected from any one or more of ethylene amine, ethylene diamine, diethylene diamine, propylene diamine, hexamethylene diamine, 2-methyl-1,5-pentamethylene-diamine, triethylene tetramine, tetraethylene pentamine, hexaethylene heptamine and aromatic tertiary amines.

Suitably the curing agent is an anhydride type curing agent, suitably a polycarboxylic anhydride curing agent, suitably selected from any one or more of methylnadic anhydride, tetrahydrophthalic anhydride, methyltetrahydrophthalic anhydride, phthalic anhydride, nadic anhydride, hexahydrophthalic anhydride, methylhexahydrophthalic anhydride, endomethylene-tetrahydrophthalic anhydride, succinic anhydride, trimellitic anhydride, pyromellitic dianhydride, maleic anhydride, dodecenylsuccinic anhydride, polysebacic polyanhydride, and nonenylsuccinic anhydride.

In embodiments wherein the adhesive composition of this first aspect is a one-part adhesive composition, the adhesive composition suitably comprises a curing agent which is a latent type curing agent. The latent type curing agent may be an amine type curing agent, for example dicyanodiamide. The latent type curing agent may be an imidazole type curing agent selected from any one or more of cyanuric acid modified imidazole, cyanuric acid modified 2-methylimidazole, cyanuric acid modified 2-ethyl-imidazole, cyanuric acid modified 2-phenyl imidazole and cyanuric acid modified 2-ethyl-4-methylimidazole.

The curing agent may be present in the adhesive composition of this first aspect in an amount of at least 5 wt %, suitably at least 10 wt %, suitably at least 12 wt %, suitably at least 15 wt %.

The curing agent may be present in the adhesive composition of this first aspect in an amount of up to 50 wt %, suitably up to 45 wt %, suitably up to 40 wt %.

The curing agent may be present in the adhesive composition of this first aspect in an amount of from 5 to 50 wt %, suitably from 10 to 40 wt %, suitably from 10 to 35 wt %.

Suitably the above amounts of curing agent apply to a one-part adhesive composition and to a two-part adhesive composition when each of the two parts are considered together for calculating the wt % of the different components including the curing agent.

In embodiments wherein the adhesive composition of this first aspect is a two-part adhesive composition, a first composition (part) of the two-part adhesive composition comprises the thermosetting resin and a second composition of the two-part adhesive composition comprises the curing agent.

Toughening Agent

Suitably the adhesive composition comprises a toughening agent. Toughening agents are polymers capable of increasing the toughness of cured thermosetting adhesives.

Suitably the toughening agent is selected from any one or more of elastomers, thermoplastic polymers, rubber, butadiene polymer or copolymer, acrylonitrile polymer or copolymer, an acrylate polymer or copolymer and acrylic polymers or copolymers.

Suitably the toughening agent is a thermoplastic polymer selected from any one or more of polyethylene, polypropylene, polyvinyl chloride, polystyrene, polymethyl methacrylate, polycarbonate, polyoxymethylene, polyamide, polyphenylene ether, polysulfone, polyvinyl acetate and copolymers thereof for example ethylene—vinyl acetate copolymer, vinyl chloride—vinyl acetate copolymer, ethylene—ethyl acrylate copolymer and ethylene—acrylic acid copolymer.

Suitably the toughening agent is a rubber selected from any one or more of chloroprene rubber, styrene-butadiene rubber, liquid nitrile rubber, acrylonitrile-butadiene rubber, butyl rubber, buna rubber, isoprene rubber, polysulfide rubber, polyurethane rubber, chlorosulfonated polyethylene elastomer and silicone rubber.

In embodiments wherein the adhesive composition of this first aspect is a two-part adhesive composition, a toughening agent is suitably present in each of a first composition and a second composition of the two-part adhesive composition. In such embodiments, the toughening agent present in the first composition may be different to the toughening agent present in the second composition.

The toughening agent may be present in the adhesive composition of this first aspect in an amount of at least 1 wt %, suitably at least 2 wt %, suitably at least 5 wt %.

The toughening agent may be present in the adhesive composition of this first aspect in an amount of up to 30 wt %, suitably up to 25 wt %, suitably up to 15 wt %.

The toughening agent may be present in the adhesive composition of this first aspect in an amount of from 1 to 25 wt %, suitably from 3 to 20 wt %, suitably from 5 to 15 wt %.

Suitably the above amounts of toughening agent apply to a one-part adhesive composition and to a two-part adhesive composition when each of the two parts are considered together for calculating the wt % of the different components including the toughening agent.

Accelerant

Suitably the adhesive composition comprises an accelerant. Accelerants are compounds which increase the rate of curing of the thermosetting resin.

Suitably the accelerant is selected from any one or more of imidazoles, imidazole salts, imidazolines, tertiary amines and salts thereof, metal salts of acetylacetone, triphenyl phosphine and phosphonium salts thereof, aryl-isocyanate adducts, hexanediol diacrylate, pentaerythritol pentaacrylate, trimethylol propane triacrylate and 3-phenyl-1,1-dimethyl urine.

Suitably the accelerant is an imidazole selected from any one or more of 2-ethyl methylimidazole, 2-phenyl imidazole, 2-phenyl-4-methylimidazole, alkyl imidazoles or the triazine derivatives of the above-described imidazoles.

Suitably the accelerant is a metal salt catalyst selected from group I metals, group II metals and lanthanoid salts.

In embodiments wherein the adhesive composition of this first aspect is a two-part adhesive composition, an accelerant is suitably present in a second composition of the two-part adhesive composition with a curing agent and is not present in a first composition of the two-part adhesive composition which comprises the thermosetting resin.

The accelerant may be present in the adhesive composition of this first aspect in an amount of at least 0.1 wt %, suitably at least 0.5 wt %, suitably at least 1 wt %.

The accelerant may be present in the adhesive composition of this first aspect in an amount of up to 20 wt %, suitably up to 15 wt %, suitably up to 10 wt %.

The accelerant may be present in the adhesive composition of this first aspect in an amount of from 0.1 to 20 wt %, suitably from 0.5 to 15 wt %, suitably from 1 to 10 wt %.

Suitably the above amounts of accelerant apply to a one-part adhesive composition and to a two-part adhesive composition when each of the two parts are considered together for calculating the wt % of the different components including the toughening agent.

Thinner

Suitably the adhesive composition comprises a thinner.

Suitably the thinner is selected from any one or more of N-butyl glycidyl ether, 2-ethyl—hexyl ether, diethylene glycol diglycidyl ether, ethylene glycol dimethyl ether, 1,4-butanediol diacrylate ether, 1,4-butanediol diglycidyl, hexanediol diglycidyl ether, epoxypentyl ethers, epoxidized cyclohexenyl compounds, limonene diepoxide, bis(2,3-epoxy-2-methyl propyl)ether, 2,3-epoxy-2-methyl propyl ethers of alkylene glycols, 1,2-bis(epoxyalkyl)cyclobutanes, glycidyl glycidate, 3,4-epoxyhexahydrobenzyl glycidyl ether, glycidyl ethers of C7 to C9 alcohols, oxymethyl-1,3-diozalane glycidyl ether, allyl glycidyl ether, butyl glycidyl ether and phenyl glycidyl ether.

Suitably the thinner is selected from any one or more of alcohols, acetates, toluene, styrene, xylene, acetone, methyl ethyl ketone, chlorobenzene, petrol, n-hexane, cyclohexane, iso-hexane, n-heptane, methylene chloride, dichloroethane, tetrachlorethylene, tetrachloroethane, carbon tetrachloride and cyclohexanone.

In embodiments wherein the adhesive composition of this first aspect is a two-part adhesive composition, the thinner may be present in either one or both of a first composition of the two-part adhesive composition and a second composition of the two-part adhesive composition. If a thinner is present in both of the first and second compositions of the two-part adhesive composition, each of the first and second compositions of the adhesive composition may comprise a different thinner, suitably selected from the thinners described above.

The thinner may be present in a suitable amount to provide the required viscosity of the adhesive composition.

Coupling Agent

The adhesive composition may comprise a coupling agent. Suitable coupling agents may be chemicals which improve the interfacial properties of particles susceptible to dielectric heating and polymers. Such coupling agents reduce the interfacial tension and the agglomeration tendency of particles susceptible to dielectric heating, thus improving their accessibility to polymer molecules. Coupling agents usually react with the particle surface but exhibit at least one side group which reacts with the polymer matrix or is at least compatible with it.

Suitably the coupling agent is selected from titanate coupling agents or silane coupling agents.

In embodiments wherein the adhesive composition of this first aspect is a two-part adhesive composition, the coupling agent is suitably present in a first composition of the two-part adhesive composition which comprises the thermosetting resin and is not present in a second composition of the two-part adhesive composition which comprises a curing agent.

The coupling agent may be present in the adhesive composition of this first aspect in an amount of from 0.05 to 2.0 wt %, suitably from 0.1 to 2.0 wt %, suitably from 0.1 to 1.0 wt %.

Stabiliser

The adhesive composition may comprise a stabilizer. Suitable stabilisers may be chemicals which inhibit the reaction between two or more other chemical components so that they can increase the storage stability of the adhesives. Such stabilisers may also protect the adhesive composition against premature aging and weathering.

Suitably the stabiliser is selected from any one or more of metal halides, metal oxides and metal alkoxides, in which the metal may be zinc, tin, titanium, cobalt, manganese or iron.

Suitably the stabiliser is selected from any one or more of thioglycolic acid, 2-ethylhexyl thioglycolate, trimethoxy boroxine and alkyl borates.

In embodiments wherein the adhesive composition of this first aspect is a two-part adhesive composition, the stabiliser is suitably present in a second composition of the two-part adhesive composition which comprises a curing agent and is not present in a first composition of the two-part adhesive composition which comprises the thermosetting resin.

The stabiliser may be present in the adhesive composition of this first aspect in an amount of from 0.05 to 2.0 wt %, suitably from 0.1 to 2.0 wt %, suitably from 0.1 to 1.0 wt %.

Viscosity

Suitably the adhesive composition, before curing, is a flowable liquid or semi-flowable paste. Suitably the adhesive composition has a viscosity below 90000 cP at room temperature (as measured by rotational viscometer).

Bonding

According to a second aspect of the present invention, there is provided a method of joining at least two parts of an article together, the method comprising the steps of:

a) providing a join between the at least two parts of the article with an adhesive composition according to the first aspect;

b) allowing or causing the adhesive composition to cure.

Suitably the steps of the method are carried out in the order step a) followed by step b).

The adhesive composition used in the method of this second aspect may have any of the suitable features and/or advantages described in the relation to the adhesive composition of the first aspect.

Using an adhesive composition of the first aspect, at least two parts (components) of an article can be joined together by applying the adhesive composition to one or both of the at least two parts, contacting the at least two parts of an article together through the adhesive composition and allowing and/or causing the adhesive composition to cure. Curing involves the monomers or prepolymers (performed polymers) of the thermosetting resin reacting with a curing agent to provide a cross-linked 3-dimensional polymer structure (a thermoset polymer) joining said at least two parts together.

Suitably the method of this second aspect provides at least two parts of an article joined together by a cured adhesive composition comprising a thermoset polymer and particles susceptible to dielectric heating produced by the adhesive composition of the first aspect on curing.

Suitably, step b) involves exposing the adhesive composition to electromagnetic radiation to accelerate curing of the adhesive composition. Curing may be accelerated with the assistance of dielectric heating by exposing the adhesive composition to electromagnetic radiation of an appropriate frequency and power. Suitably the electromagnetic radiation has a frequency of from 10 MHz to 20 GHz. In some embodiments the electromagnetic radiation, suitably radiofrequency radiation, has a frequency of from 10 MHz to 50 MHz, suitably from 13.5 MHz to 27 MHz. In some embodiments the electromagnetic radiation, suitably microwave radiation, has a frequency of from 800 MHz to 5 GHz, for example 900 MHz, 2.45 GHz or 2.495 GHz. Suitably the electromagnetic radiation has a power up to 50 Watts, suitably from 10 to 25 Watts. The particles susceptible to dielectric heating in the adhesive composition absorb the electromagnetic radiation and transform said radiation to heat energy which is transferred the adhesive composition surrounding the particles susceptible to dielectric heating, heating the adhesive composition and accelerating the rate of the reaction between a curing agent and the thermosetting resin.

Disassembly

According to a third aspect of the present invention, there is provided a method of disassembling at least two parts of an article which are joined by a cured adhesive composition comprising a thermoset polymer and particles susceptible to dielectric heating, the method comprising the steps of:

i) exposing the cured adhesive composition to electromagnetic energy having a frequency in the range of from 10 MHz to 20 GHz to heat the particles susceptible to dielectric heating comprised within the cured adhesive composition;

ii) separating the at least two parts of the article from each other;

wherein the particles susceptible to dielectric heating are selected from any one or more of hollow nanospheres, nanotubes, nanofibres, nanosheets, graphene, graphene derivatives, nano/micro hybrids and mixtures of two or more nanoscale particles.

The particles susceptible to dielectric heating may also be nanorods, suitably carbon nanorods.

Suitably the steps of the method are carried out in the order step i) followed by step ii).

Suitably the cured adhesive composition is produced by curing an adhesive composition according to the first aspect.

Suitably the at least two parts of an article which are joined by a cured adhesive composition were joined together by a method according to the second aspect.

The particles susceptible to dielectric heating may have any of the features and/or advantages described in relation to the particles susceptible to dielectric heating in the first aspect.

The at least two parts (components) of an article which are joined by the adhesive composition after curing may be disassembled by exposing the cured adhesive composition (which provides a join comprising a thermoset polymer) to electromagnetic radiation of an appropriate frequency and power to degrade and/or decompose the cured adhesive composition such that the at least two components previously joined by the cured adhesive composition can be easily separated.

Suitably the cured adhesive composition is degraded and/or decomposed by radio frequency and/or microwave radiation which heats the particles susceptible to dielectric heating as described above. Suitably the cured adhesive composition is degraded and/or decomposed by the electromagnetic radiation having a frequency of from 10 MHz to 20 GHz.

In some embodiments the electromagnetic radiation, suitably radiofrequency radiation, has a frequency of from 10 MHz to 50 MHz, suitably from 13.5 MHz to 27 MHz.

Alternatively the cured adhesive composition is degraded and/or decomposed by electromagnetic radiation, suitably microwave radiation, having a frequency of from 800 MHz to 5 GHz, for example 900 MHz, 2.45 GHz or 2.495 GHz.

The at least two parts of an article joined by the cured adhesive composition may each be formed from materials independently selected from any one or more of metals, ceramics, glass, woods, plastics, rubber, cement, stone and composite materials. Suitable composite materials include metal alloys, metal-metal oxide composites, carbon-metal composites, metal-plastic composites, carbon-plastic composites, metal oxide-plastic composite. Therefore the adhesive composition of the first aspect may advantageously allow a wide range of materials to be joined and subsequently disassembled to recycle, replace and/or repair said parts. Suitably step i) degrades and/or decomposes the cured adhesive composition. Suitably step i) reduces the structural integrity of the cured adhesive composition, suitably by at least 90%. Suitably step i) reduces the tensile shear strength of the cured adhesive composition, suitably by at least 80%, suitably at least 90%, suitably at least 95%, suitably as measured by stressing the join provided by the cured adhesive composition until failure. By the reference to the strength of the cured adhesive composition we mean the strength of the join between the at least two parts of an article provided by the cured adhesive composition.

In a further aspect of the present invention, there is provided a method of joining an implant to a part of an animal or human body, the method comprising the steps of:

a) providing a join between the implant and the part of part of an animal or human body with an adhesive composition according to the first aspect;

b) allowing or causing the adhesive composition to cure.

The adhesive composition used in the method of this second aspect may have any of the suitable features and/or advantages described in the relation to the adhesive composition of the first aspect.

The method of this aspect may have any of the suitable features of the method of the second aspect.

The implant may be a dental or a biomedical implant, for example a dental veneer.

Suitably the part of the animal or human body is bone or tooth.

Method of Forming the Adhesive Composition

In embodiments wherein the adhesive composition is a two-part adhesive composition, the two-part adhesive composition may be prepared by separately preparing a first composition and a second composition.

The first composition may be prepared by combining the thermosetting resin with a toughening agent, a thinner and a coupling agent, stirring at high speed at a temperature of from 30 to 100° C., for example for 30 minutes, adding the particles susceptible to dielectric heating and stirring at high speed at a temperature of from 40 to 80° C., for example for 40 minutes, and then stirring the under vacuum to remove any air bubbles present.

The second composition may be prepared by combining a curing agent, a toughening agent, a thinner, an accelerant and a stabiliser, stirring at high speed at a temperature of from 30 to 100° C., for example for 30 minutes, optionally adding the particles susceptible to dielectric heating and stirring at high speed at a temperature of from 40 to 80° C., for example for 40 minutes, and then stirring the under vacuum to remove any air bubbles present.

In embodiments wherein the adhesive composition is a one-part adhesive composition, the one-part adhesive composition may be prepared by combining the thermosetting resin with a toughening agent, a thinner, an accelerant, a coupling agent and a stabiliser, stirring at high speed at a temperature of from 30 to 80° C., for example for 30 minutes, adding the particles susceptible to dielectric heating and a curing agent and stirring at high speed at a temperature of from 40 to 60° C., for example for 40 minutes, and then stirring the under vacuum to remove any air bubbles present.

In some embodiments a two-part or one-part adhesive composition without particles susceptible to dielectric heating may be prepared according to the procedure above, and then the particles susceptible to dielectric heating can be mixed with the as-prepared thermosetting adhesive with additional vacuum treatment to provide the adhesive composition of the present invention. The particles susceptible to dielectric heating could be added into either a first or a second composition (part) of a two-part thermosetting adhesive or may be added into both parts. The particles susceptible to dielectric heating could be added into the as-prepared thermosetting adhesive at any time even just before the point of intended use of the adhesive composition. Similarly, the adhesive composition obtained in this way is also degradable with the assistance of dielectric heating.

According to a fourth aspect of the present invention, there is provided an article comprising a join, the join provided by an adhesive composition according to the first aspect, the adhesive composition having been allowed or caused to set.

Suitably, there is provided an article comprising a join, the join comprising a cured adhesive composition comprising a thermoset polymer and particles susceptible to dielectric heating selected from any one or more of hollow nanospheres, nanotubes, nanofibres, nanosheets, graphene, graphene derivatives, nano/micro hybrids and mixtures of two or more nanoscale particles.

The particles susceptible to dielectric heating may also be nanorods, suitably carbon nanorods.

According to a further aspect of the present invention, there is provided a use of an adhesive composition according to the first aspect for reversibly joining at least two parts of an article together.

The use of this aspect may have any of the features described in relation to the second and third aspects.

According to a further aspect of the present invention, there is provided a use of particles susceptible to dielectric heating selected from any one or more of hollow nanospheres, nanotubes, nanofibres, nanosheets, graphene, graphene derivatives, nano/micro hybrids and mixtures of two or more nanoscale particles, for rendering an adhesive composition susceptible to degradation and/or decomposition by electromagnetic radiation.

The particles susceptible to dielectric heating may also be nanorods, suitably carbon nanorods.

The use of this aspect may have any of the features described in relation to the first, second and third aspects.

Method of Preparing Hollow Nanospheres

According to a further aspect of the present invention, there is provided a method of preparing hollow nanospheres of $Fe_3O_4$, the method comprising the steps of:

a) dissolving an Fe salt, an ionic surfactant and a weak base in a solvent to provide a solution;

b) heating the solution produced in step a) to precipitate the hollow nanospheres of $Fe_3O_4$.

The Fe salt may be a hydrate. The Fe salt may be anhydrous. Suitably the Fe salt is selected from a halide, nitrate, sulfate or acetate salt. Suitably the Fe salt is a chloride salt. Suitably the Fe salt is $FeCl_3$, for example $FeCl_3 \cdot 6H_2O$.

Suitably the ionic surfactant is a cationic surfactant. Suitably the cationic surfactant is selected from cetrimonium bromide (CTAB), cetrimonium chloride (CTAC), dodecyltrimethylammonium bromide (DTAB), dodecyltrimethylammonium chloride (DTAC) or myristyltrimethylammonium bromide (TTAB). Suitably the cationic surfactant is cetrimonium bromide (CTAB).

Suitably the weak base is selected from aqueous ammonia, urea or an amine. Suitably the weak base is an amine. Suitably the weak base is a polyamine, suitably hexamethylenetetramine (HMTA).

Suitably the solvent is an organic solvent, suitably a polar organic solvent, for example ethylene glycol. The solvent may be selected from any one or more of the following: propanol, isopropanol, propylene glycol, butylene glycol, ethylene glycol or glycerin.

Suitably step b) involves heating the solution in a sealed autoclave. Suitably step b) involves heating the solution to at least 150° C., suitably at least 180° C., suitably at least 220° C.

Suitably step b) involves heating the solution until a precipitate of hollow nanospheres of $Fe_3O_4$ is formed. Suitably step b) involves heating the solution for at least 1 hour, suitably at least 5 hours, suitably at least 12 hours.

Suitably the method involves a step c) of washing and/or drying the hollow nanospheres of $Fe_3O_4$. Suitably the hollow nanospheres of $Fe_3O_4$ are washed with deionised water and/or ethanol. Suitably hollow nanospheres of $Fe_3O_4$ are drying under vacuum, suitably with heating, for example to a temperature above 60° C.

EXAMPLE 1

A two-part thermosetting adhesive composition was prepared using the following weight ratios of components:

| Part A (first part of the two-part adhesive composition) | |
|---|---|
| (A1) Thermosetting resin: | |
| acrylic epoxy resin | 24 wt % |
| bisphenol F epoxy resin | 13 wt % |
| (A2) Toughening agent: acrylonitrile-butadiene rubber | 5 wt % |
| (A3) Thinner: styrene | 7 wt % |

| -continued | |
|---|---|
| (A4) Coupling agent: titanate coupling agent | 0.5 wt % |
| (A5) Particles susceptible to dielectric heating: $Fe_3O_4$ hollow nano spheres | 0.5 wt % |
| Total of Part A: | 50 wt % |
| Part B (second part of the two-part adhesive composition) | |
| (B1) Curing agent: triethylene tetramine | 23.8 wt % |
| (B2) Toughening agent: ethylene - acrylic acid copolymer resin | 11.9 wt % |
| (B3) Thinner: phenyl glycidyl ether | 8.9 wt % |
| (B4) Accelerant: hexanediol diacrylate | 4.8 wt % |
| (B5) Stabilizer: trimethoxy boroxine | 0.6 wt % |
| Total of Part B: | 50 wt % |
| Total of Part A and Part B: | 100 wt % |

The $Fe_3O_4$ hollow nanospheres are used as the particles susceptible to dielectric heating in this embodiment. The thickness of shell is from 30 to 60 nm and the outer diameter is from 200 to 300 nm.

Synthesis Procedure

Part A of the two-part adhesive composition was prepared by combining the acrylic epoxy resin, bisphenol F epoxy resin, acrylonitrile-butadiene rubber, styrene and 1titanate coupling agent and mixing mixed for 30 min at 60° C. using a high-speed mixer. The $Fe_3O_4$ hollow nanospheres were added into the above mixture with high-speed homogenization for 40 min at 60° C. The temperature was then decreased to 25° C. and the mixture further stirred at low speed under vacuum to remove any air bubbles.

Part B of the two-part adhesive composition was prepared by combining the triethylene tetramine, ethylene-acrylic acid copolymer resin, phenyl glycidyl ether, hexanediol diacrylate and trimethoxy boroxine and mixing for 30 min at 60° C. using a high-speed mixer. The temperature was then decreased to 25° C. and the mixture further stirred at low speed under vacuum to remove any air bubbles.

Bonding Procedure

Two polyimide plastic plates were used to provide the target surfaces to be bonded (the at least two parts of an article to be joined). The size of each plate was 27 mm×7 mm×2 mm, on which the target surface to be bonded is 5 mm×7 mm. Parts A and B of the adhesive composition were mixed together with a weight ratio of 1:1 just before the bonding procedure was carried out. The mixed adhesive composition was then coated on to the surfaces of the two polyimide plastic plates. The surfaces were tightly contacted with each other and this contact was maintained for 6 minutes while the mixed adhesive composition was exposed to microwave radiation with a frequency of 2.45 GHz and a power of 20 Watts, after which the adhesive composition was cured completely to provide a join of cured adhesive composition between the two polyimide plastic plates.

Disassembly Procedure

The two polyimide plastic plates bonded by the cured adhesive composition were exposed to microwave radiation with a frequency of 2.45 GHz and a power of 100 Watts. The temperature of the cured adhesive composition between plates was monitored by an infrared temperature sensor. The temperature of the cured adhesive composition increased to 295° C. during exposure to the microwave radiation for 3 minutes. During this time the cured adhesive composition degraded and the two polyimide plastic plates were separated.

EXAMPLE 2

A two-part thermosetting adhesive composition was prepared using the following weight ratios of components:

| Part A | |
|---|---|
| (A1) Thermosetting resin: | |
| silicone modified epoxy resin | 35.6 wt % |
| silicone resin | 8.9 wt % |
| (A2) Toughening agent: silicone rubber | 4.4 wt % |
| (A3) Coupling agent: silane coupling agent | 0.9 wt % |
| (A4) Particles susceptible to dielectric heating: single layered reduced graphene oxide powder | 0.2 wt % |
| Total of Part A: | 50 wt % |
| Part B | |
| (B1) Curing agent: | |
| triethanolamine | 23.6 wt % |
| ethylene diamine | 8.6 wt % |
| (B2) Toughening agent: ethylene - vinyl acetate copolymer | 6.4 wt % |
| (B3) Thinner: 2,3-epoxy-2-methyl propyl ethers of alkylene glycols | 4.3 wt % |
| (B4) Accelerant: 3-phenyl-1,1-dimethyl urine | 6.4 wt % |
| (B5) Stabilizer: thioglycolic acid | 0.7 wt % |
| Total of Part B: | 50 wt % |
| Total of Part A and Part B: | 100 wt % |

The single layered reduced graphene oxide powder has a sheet length of about 100 nm.

Synthesis Procedure

Part A of the two-part adhesive composition was prepared by combining the silicone modified epoxy resin, silicone resin, silicone rubber and silane coupling agent and mixing for 30 min at 80° C. using a high-speed mixer. The single layered reduced graphene oxide powder was added into the above mixture with high-speed homogenization for 40 min at 60° C. The temperature was then decreased to 25° C. and the mixture further stirred at low speed under vacuum to remove any air bubbles.

Part B of the two-part adhesive composition was prepared by combining the triethanolamine, ethylene diamine, ethylene—vinyl acetate copolymer, 2, 3-epoxy-2-methyl propyl ethers of alkylene glycols, 3-phenyl-1,1-dimethyl urine and thioglycolic acid and mixing for 30 min at 50° C. using a high-speed mixer. The temperature was then decreased to 25° C. and the mixture further stirred at low speed under vacuum to remove any air bubbles.

Bonding Procedure

The bonding procedure of Example 1 was repeated using the adhesive composition of this Example 2 using two ceramic plates instead of the polyimide plastic plates. In this example the adhesive composition was exposed to radio frequency radiation with a frequency of 27 MHz and a power of 10 Watts to cure the adhesive composition.

Disassembly Procedure

The disassembly procedure of Example 1 was repeated using the joined plates of this Example 2 by exposing the cured adhesive composition to radio frequency radiation with a frequency of 27 MHz and a power of 500 Watts for 30 minutes. The temperature of the cured adhesive composition increased to 450° C. during the 30 minutes, resulting in the degradation of the cured adhesive composition and the separation of the joined plates.

EXAMPLE 3

A two-part thermosetting adhesive composition was prepared using the following weight ratios of components:

| Part A | |
|---|---|
| (A1) Thermosetting resin: | |
| polysulfone modified epoxy resin | 28.1 wt % |
| bisphenol A epoxy resin | 18.7 wt % |
| (A2) Toughening agent: styrene-butadiene rubber | 2.3 wt % |
| (A3) Coupling agent: titanate coupling agent | 0.5 wt % |
| (A4) Particles susceptible to dielectric heating: graphene/ferrite mixture | 0.4 wt % |
| Total of Part A: | 50 wt % |
| Part B | |
| (B1) Curing agent: 2-methyl-1,5-pentamethylene-diamine | 31.2 wt % |
| (B2) Toughening agent: liquid nitrile rubber | 4.5 wt % |
| (B3) Thinner: diethylene glycol diglycidyl ether | 11.2 wt % |
| (B4) Accelerant: 2-ethyl-4-methylimidazole | 2.2 wt % |
| (B5) Stabilizer: 2-ethylhexyl thioglycolate | 0.9 wt % |
| Total of Part B: | 50 wt % |
| Total of Part A and Part B: | 100 wt % |

The graphene/ferrite mixture is used as the particles susceptible to dielectric heating sensitive in Part A. The ratio of graphene to ferrite is 6:4. The graphene is in the form of a powder with a particle size of about 200 nm and ferrite is in the form of a powder with a particle size of about 400 nm. The ferrite powder has a primary-secondary aggregated morphology in which secondary grains with a particle size of about 400 nm are aggregated by primary grains with the size of about 10 nm.

Synthesis Procedure

Part A of the two-part adhesive composition was prepared by combining the polysulfone modified epoxy resin, bisphenol A epoxy resin, styrene-butadiene rubber and titanate coupling agent and mixing for 30 min at 80° C. using a high-speed mixer. The graphene/ferrite mixture was added into the above mixture with high-speed homogenization for 40 min at 60° C. The temperature was then decreased to 25° C. and the mixture further stirred at low speed under vacuum to remove any air bubbles.

Part B of the two-part adhesive composition was prepared by combining the 2-methyl-1,5-pentamethylene-diamine, liquid nitrile rubber, diethylene glycol diglycidyl ether, 2-ethyl-4-methylimidazole and 2-ethylhexyl thioglycolate and mixing for 30 min at 60° C. using a high-speed mixer. The temperature was then decreased to 25° C. and the mixture further stirred at low speed under vacuum to remove any air bubbles.

Bonding Procedure

The bonding procedure of Example 1 was repeated using the adhesive composition of this Example 3 using two aluminium plates instead of the polyimide plastic plates. In this example the adhesive composition was exposed to radio frequency radiation with a frequency of 2.45 GHz and a power of 15 Watts for 5 minutes to cure the adhesive composition.

Disassembly Procedure

The disassembly procedure of Example 1 was repeated using the joined plates of this Example 3 by exposing the cured adhesive composition to microwave radiation with a frequency of 2.45 GHz and a power of 800 Watts for 10 minutes. The temperature of the cured adhesive composition increased to 550° C. during the 10 minutes, resulting in the degradation of the cured adhesive composition and the separation of the joined plates.

EXAMPLE 4

A one-part thermosetting adhesive composition was prepared using the following weight ratios of components:

| (1) Thermosetting resin: | |
|---|---|
| polyurethane modified epoxy resin | 27.11 wt % |
| bisphenol A | 9.04 wt % |
| (2) Toughening agent: polyurethane rubber | 10.85 wt % |
| (3) Thinner: 1,2-bis(epoxyalkyl)cyclobutanes | 30.73 wt % |
| (4) Accelerant: triphenyl phosphine | 1.81 wt % |
| (5) Stabilizer: trimethoxy boroxine | 0.36 wt % |
| (6) Coupling agent: silane coupling agent | 0.18 wt % |
| (7) Curing agent: cyanuric acid modified 2-ethyl-4-methylimidazole | 19.88 wt % |
| (8) Particles susceptible to dielectric heating: mesoporous ferrite/carbon nanofibre mixture | 0.04 wt % |
| Total: | 100 wt % |

The mesoporous ferrite/carbon mixture is used as the particles susceptible to dielectric heating in this embodiment. The mesoporous ferrite has a pore size of about 20 nm and is coated by carbon, in which the thickness of carbon coating in the mesopores of ferrite is from 3 to 10 nm.

Synthesis Procedure

The one-part adhesive composition was prepared by combining the polyurethane modified epoxy resin, bisphenol A, polyurethane rubber, 1,2-bis(epoxyalkyl)cyclobutanes, triphenyl phosphine, trimethoxy boroxine and silane coupling agent and mixing for 30 min at 70° C. using a high-speed mixer. The mesoporous ferrite/carbon mixture and the cyanuric acid modified 2-ethyl-4-methylimidazole were then added into the above mixture with high-speed homogenization for 40 min at 50° C. The temperature was then decreased to 25° C. and the mixture further stirred at low speed under vacuum to remove any air bubbles.

Bonding Procedure

The Bonding Procedure of Example 1 was Repeated Using the Adhesive Composition of this Example 4 using two poly-p-oxybenzoyl plastic plates instead of the polyimide plastic plates. In this example the adhesive composition was exposed to microwave radiation with a frequency of 2.495 GHz and a power of 20 Watts for 8 minutes to cure the adhesive composition.

Disassembly Procedure

The disassembly procedure of Example 1 was repeated using the joined plates of this Example 4 by exposing the cured adhesive composition to microwave radiation with a frequency of 2.495 GHz and a power of 100 Watts for 2 minutes. The temperature of the cured adhesive composition increased to 300° C. during the 2 minutes, resulting in the degradation of the cured adhesive composition and the separation of the joined plates.

Preparation of $Fe_3O_4$ Hollow Nanospheres

The $Fe_3O_4$ hollow nanospheres used in Example 1 were prepared by dissolving 0.006 mol cetrimonium bromide (CTAB) and 0.0214 mol hexamethylenetetramine (HMTA) in 60 mL ethylene glycol (EG), then 0.016 mol $FeCl_3.6H_2O$ was added under continuous stirring until it was dissolved totally. The solution was transferred to a 100 ml Teflon-lined autoclave, then sealed and maintained at 220° C. for 12 h. After the autoclave cooled down to room temperature naturally, the black precipitate was washed with deionized water and absolute ethanol for several times and separated by magnetic decantation. Finally, the product $Fe_3O_4$ hollow nanospheres were dried at 80° C. for 12 h under vacuum.

The size and morphology of $Fe_3O_4$ samples were characterized using field emission scanning electron microscopy (FESEM, Hitachi SU-70 system) at accelerating voltages of 10-20 kV. Specifically, powders of samples were mounted onto conductive copper tapes, which were then attached onto the surfaces of SEM brass stubs. The samples were then conductively coated with gold by a sputtering method to minimize charging effects under FESEM imaging conditions.

Both transmission electron microscopy (TEM) and high resolution transmission electron microscopy (HRTEM) characterizations were performed using a JEOL JEM 2100F field emission microscope equipped with a Gatan Ultrascan CCD camera and EDAX Genesis EDS facility, as well as with the potential of performing SAED. To prepare the HRTEM specimens, the powder samples were dispersed ultrasonically in anhydrous ethanol. One drop of the suspension was placed on a carbon film supported on a copper grid and allowed to dry in air before the specimens were transferred into the microscope.

X-ray diffraction (XRD) analysis was conducted using a PANalytical X'Pert PRO MRD instrument with a Cu $K_u$ radiation source ($\lambda$=1.5418 Å) and an X'celerator detector. Rietveld refinement was carried out using X'Pert High Score plus software.

The morphology and size of the as prepared $Fe_3O_4$ hollow nanospheres were characterized by FESEM and TEM. Picture a of FIG. 1 is an FESEM image of the product showing a larger amount of well dispersed spherical shapes with the diameter of about 250 nm. The further magnified FESEM image in b of FIG. 1 demonstrates a representative break sphere, indicating its hollow spherical morphology with the shell thickness and inner diameter of about 50 nm and 150 nm, respectively. TEM image in c of FIG. 1 also proves the hollow spherical construction with almost the same size and shell thickness, compared with FESEM images. The marked area is further magnified in HRTEM image of d of FIG. 1, showing the well-defined 2D lattice fringes corresponding well with the (311) planes of magnetite $Fe_3O_4$ polymorph. The corresponding SAED pattern located in the inset of d of FIG. 1 confirms the single crystallinity of as-prepared $Fe_3O_4$ hollow nanospheres.

Figure 1B:
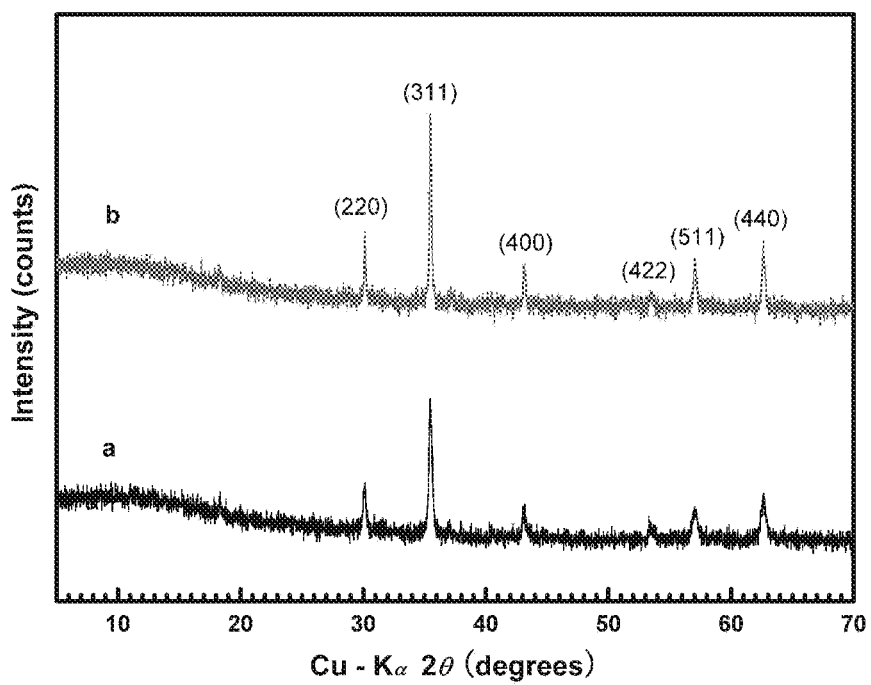
FIG. 1B shows an XRD pattern of a product according to the invention.

XRD pattern in FIG. 1B confirms the product obtained in the typical procedure is an $Fe_3O_4$ polymorph, in which the diffraction peaks at 2θ=30.1°, 35.4°, 43.1°, 56.9° and 62.5° correspond well with the (220), (311), (400), (511) and (440) lattice planes of magnetite $Fe_3O_4$ (JCPDS 19-0629) without any other impurity.

EXAMPLE 5

The $Fe_3O_4$ hollow nanospheres were dispersed into pure epoxy resin (Sigma-Aldrich) in sonication at 80° C. for 30 min. Then the hardeners methyl nadic anhydride (MNA) and dodecenylsuccinic anhydride (DDSA) (Sigma-Aldrich) and accelerator 2,4,6-tris(dimethylaminomethyl)phenol (DMP) (Sigma-Aldrich) were added into the epoxy resin with the $Fe_3O_4$ hollow nanospheres dispersed in it with stirring. A uniform mixture was then obtained, dropped onto a quartz slides, and transferred in vacuum oven at 60° C. for 3 days. Then the cured $Fe_3O_4$-epoxy resin composite sheet (25.4 mm×25.4 mm×1 mm) was obtained for further microwave degradation testing in single mode microwave reactor CEM Discover SP with an infrared (IR) Temperature Sensor. For comparison, the pure epoxy resin sheet was also prepared in the same procedure.

Field emission scanning electron microscopy (FESEM) was performed using Hitachi SU-70 system at accelerating voltages of 10-20 kV. Transmission electron microscopy (TEM) was performed using a JEOL JEM 2100F field emission microscope equipped with a Gatan Ultrascan CCD camera and EDAX Genesis EDS facility, as well as with the potential of performing SAED. X-ray diffraction (XRD) analysis was conducted using a PANalytical X'Pert PRO MRD instrument with a Cu $K_\alpha$ radiation source (A=1.5418 Å) and an X'celerator detector.

3D X-ray microscope (XRM) analysis was performed using VersaXRM-500 employing a high-energy X-ray source (80 kV). The hardness and modulus of the cured $Fe_3O_4$-epoxy resin composites (or pure epoxy resin), obtained before and after microwave irradiation, were characterized by nanoindentation using the Nanoindenter G200 developed by Agilent Technologies. Before test, small sample pieces were mounted in clear epoxy cylinders with the fibre direction perpendicular to the top face of the cylinder in order to expose the cross sections. Mounting the samples in this way facilitated semi-automatic grinding and polishing down to a final polishing suspension particle size of 50 nm. The procedures used throughout the grinding and polishing sample preparation procedures were chosen to ensure that surface damage and reaction with the polishing agents were kept to a minimum. High depth CSM indentations were used to ensure there was no property change between that of the surface material and the material further from the surface as a result of the sample preparation procedures.

The nanoindentation experiments were carried out using the Nanoindenter G200 developed by Agilent Technologies. The continuous stiffness measurement (CSM) technique was used to carry out the indentations, which allowed the contact stiffness to be calculated throughout the indentation's loading cycle. This in turn allowed the elastic modulus to be calculated continuously as a function of the indentation depth, using the Oliver and Pharr method (M. Hardiman, T. J. Vaughan, C. T. McCarthy, Compos Part A, 2015, 68, 296-303). The load and displacement resolutions of the system are 50 nN and 0.01 nm respectively, and a Berkovich tip geometry was used. The indentations were assigned a maximum penetration depth set point of 5 μm with a strain rate target of 0.05/s. This strain rate target was reached with a maximum deviation of ±0.01/s for all depths deeper than 100 nm. The CSM settings were programmed to apply a harmonic displacement of 2 nm and a frequency of 45 Hz. The indentation sites were targeted using an optical microscope.

A universal tensile machine (UTM, Tinius Olsen H25KS) was used to carry out the tensile shear tests room temperature. $Fe_3O_4$-ER (ER=epoxy resin) composites (or pure epoxy resin as comparison) were used for bonding single-lap-shear (SLS) joints in this study. The substrates were high stable epoxy plastic slides (60 mm×25.4 mm×2 mm) with no surface coating. 0.63 ml of uncured $Fe_3O_4$-ER composites (or pure epoxy resin) was used for bonding the joints with area of 25.4 mm×25.4 mm. The total length of the bonded joints is 94.6 mm. Such customized dimension of SLS specimens is designed for matching the cavity size of microwave reactor in order to further investigate the degradation behaviour by dielectric heating. Then the cured joints were exposed under single-mode microwave irradiation at fixed power of 100 W and frequency at 2.45 GHz for 0-3 min. In order to ensure that the loading direction was parallel to the bond-line, two compensation spacers were bonded with the SLS specimens after microwave irradiation. The crosshead velocity was set at a constant velocity of 2 mm/min.

Figure 2:
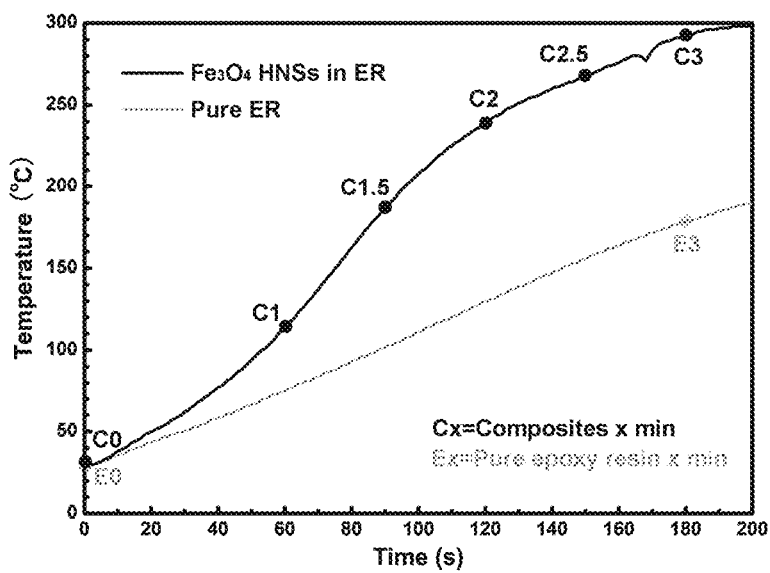
FIG. 2 is a graph of the dielectric heating performance of Fe3O4-ER and pure epoxy resin.

FIG. 2 shows the dielectric heating performance of $Fe_3O_4$-ER composites and pure epoxy resin indicating the temperature increasing as a function of time. The pure epoxy resin shows poor dielectric heating performance as its temperature is below 180° C. after single mode microwave irradiation for 3 mins at 100 W, 2.45 GHz. Dielectric heating performance of the $Fe_3O_4$-ER composites is much better than that of pure epoxy resin over irradiation time. Interestingly, the slope of such temperature curve increases from 0 to 1.5 mins, shown in the FIG. 2. The temperature goes up to 239° C. for 2 mins dielectric heating. The slope slowly decreases from 1.5 to 3 mins and the temperature increases to 292° C. for 3 mins dielectric heating. It is noticed that an endothermic peak is shown at about 168 s, indicating that a severe structural (or morphological) collapse of $Fe_3O_4$-ER composites occurs around this period.

Figure 3:
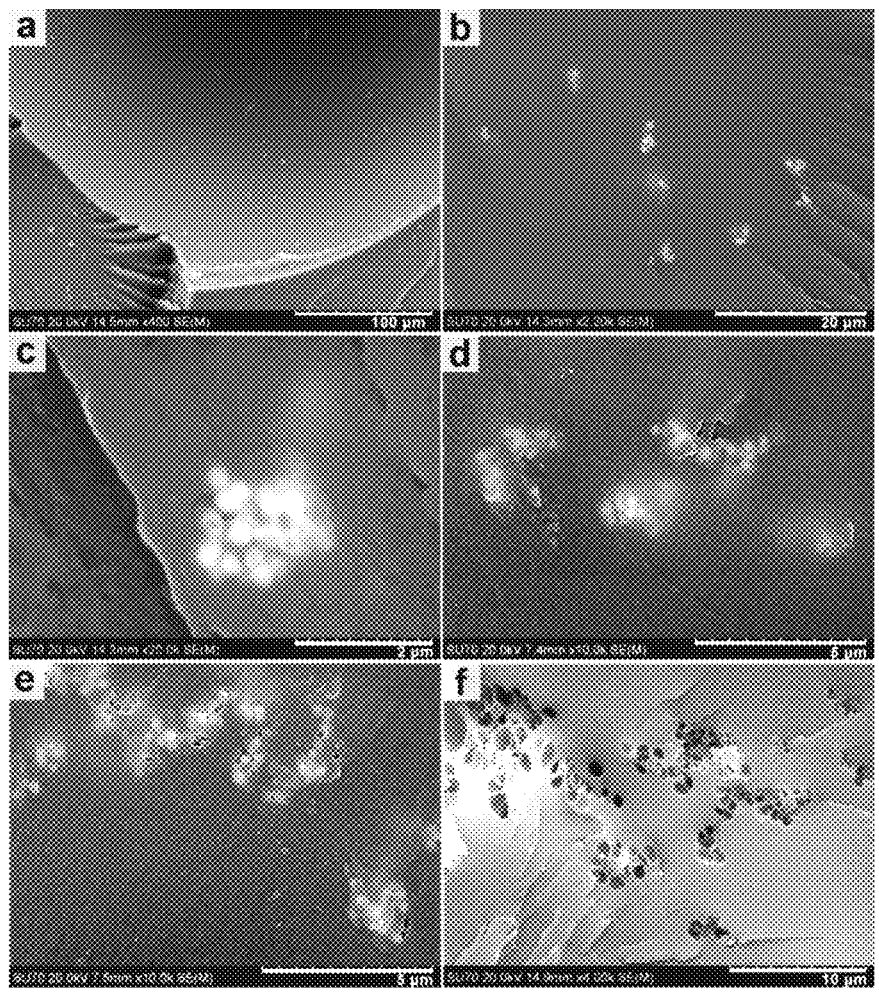
FIGS. 3-4 show FESEM images of cross sections of a cured Fe3O4-ER composite sheet before and after single-mode microwave irradiation.
Figure 4:
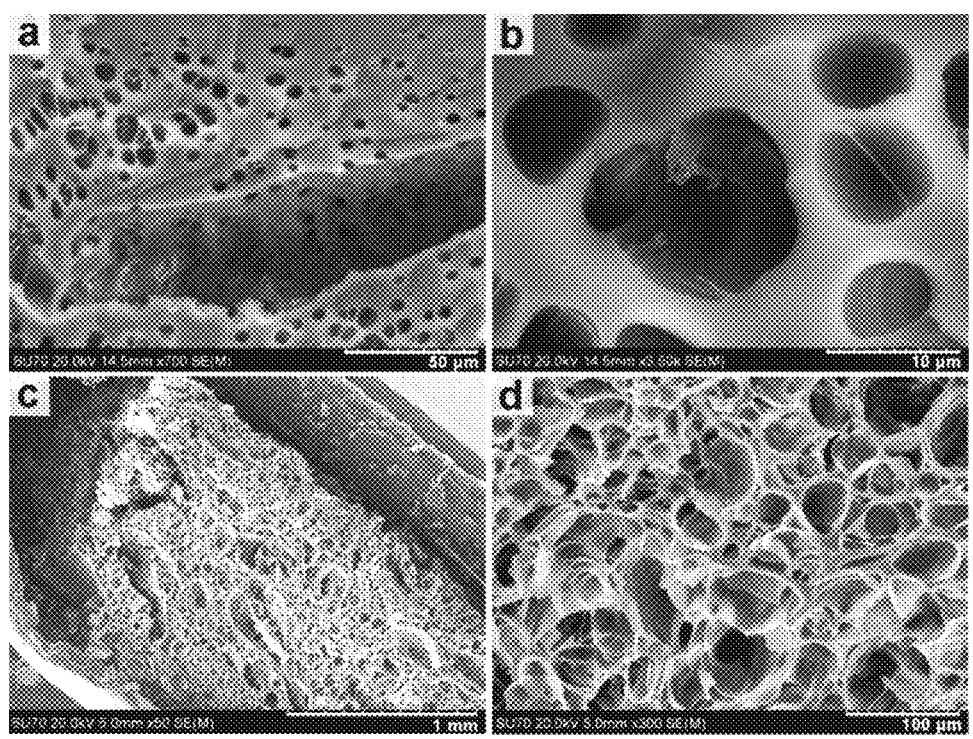

FIGS. 3 and 4 show the FESEM images of the cross sections of cured $Fe_3O_4$-ER composite sheet (1.0 wt % $Fe_3O_4$ HNSs in epoxy resin) before and after single-mode microwave irradiation for 0-3 mins. Part a of FIG. 3 shows the global FESEM image of the cured $Fe_3O_4$-ER composite sheet without microwave exposure in low magnification, signifying the $Fe_3O_4$ HNSs are embedded in the cured epoxy resin with good dispersity. This is also confirmed by the magnified images of b of FIG. 3, which also indicates the $Fe_3O_4$ hollow nanospheres (white dots) spread all over the fracture surface (or underneath the surface), and the distance between $Fe_3O_4$ hollow sphere clusters is about 5-10 μm. Further magnified FESEM image of c of FIG. 3 shows that several hollow nanospheres are aggregated together and some of them are break hollow nanospheres, in which each of them exhibits the equivalent size of about 250 nm, compared with the results shown in FIG. 1. SEM image of d of FIG. 3 shows some tiny holes and slight cracks are generated close to the $Fe_3O_4$ hollows in the $Fe_3O_4$-ER composite sheet after 1 min single-mode microwave irradiation at 100 W. After 1.5 mins microwave exposure, more holes with the size of about 200 nm are generated in the position of $Fe_3O_4$ hollow nanospheres, as shown in e of FIG. 3, which indicates that the degradation of epoxy resin starts from the surroundings of $Fe_3O_4$ hollow nanospheres. The hollow cavities with the size of about 1-2 μm are obtained after 2 mins microwave exposure, as shown in the SEM image of f of FIG. 3.

The degradation performance is further improved between 2 and 2.5 minutes. SEM image of a of FIG. 4 exhibits the numerous hollow cavities with the size of about several micrometres spread all over the section surface. A vertical fracture shown in a of FIG. 4 proved that the hollow cavities were generated inside of $Fe_3O_4$-ER composite sheet uniformly. A magnified SEM image shown in b of FIG. 4 presented the hollow cavities with the size of about 5-10 μm, which are much greater than the size of $Fe_3O_4$ hollow spheres. The structure of cured $Fe_3O_4$-ER composite sheet was totally changed after 3 minutes microwave exposure at 100 W, 2.45 GHz. The global FESEM images (c of FIG. 4) show that the cured $Fe_3O_4$-ER composite sheet with sponge-like, hollow network structure resulted after microwave exposure for 3 mins. The corresponding magnified FESEM image shown in d of FIG. 4 exhibits the hollow texture with the cavity size up to dozens of micrometres. It is worthwhile to note that the $Fe_3O_4$ hollow nanospheres can not be found on the surface even under 20 kV in FIG. 4, and the distance between the centre of hollow cavities is about 5-10 μm in a of FIG. 4, strongly indicating that the degradation started from the surroundings of $Fe_3O_4$ hollow sphere clusters.

Figure 5:
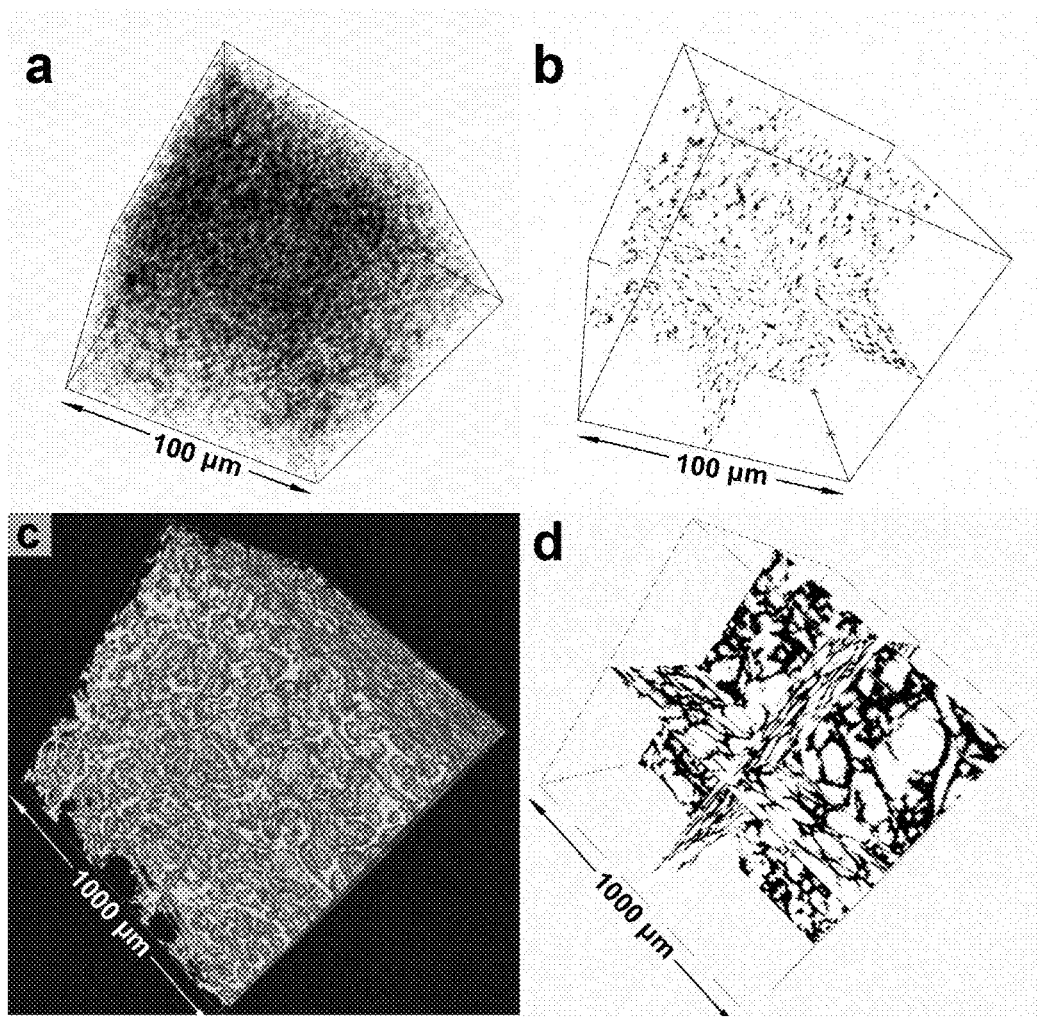
FIG. 5 shows 3D X-ray microscopy characterization results of Fe3O4-ER composites.

3D X-ray microscopy characterization results are shown in FIG. 5 and further confirm the dispersibility and dielectric heating performance of $Fe_3O_4$-ER composites in three spatial dimensions. To be clear, the green and black colours in a and b of FIG. 5 represent $Fe_3O_4$ and epoxy resin, but the green and black colours in c and d of FIG. 5 represent epoxy resin and hollow cavities, respectively. Part of a of FIG. 5 shows the 3D internal morphologies of the cured $Fe_3O_4$-ER composites before microwave irradiation, indicating that the $Fe_3O_4$ hollow nanospheres are well dispersed in 3D epoxy resin substrates. The corresponding orthoslice shown in b of FIG. 5 demonstrates the embedding performance of $Fe_3O_4$ hollow nanospheres in three spatial dimensions. The 3D X-ray computed tomography of $Fe_3O_4$-ER composites after 3 mins dielectric heating was shown in c of FIG. 5, indicating that the 3D sponge-like morphologies with well distributed hollow cavities with the size of about dozens of microns. The corresponding orthoslice shown in d of FIG. 5 demonstrates the degraded holes with good three dimensional distributions. The results indicate that the smooth and uniform epoxy resin substance can be maintained after microwave irradiation with little damage.

The hollow spherical nature of the $Fe_3O_4$ likely improved such performance. The hollow cavities grow over time under microwave irradiation and then merge with each other to form the greater hollow cavities of micrometres size and finally a hollow network structure. This was confirmed by the FESEM results in FIGS. 3 and 4 and the 3D X-ray computed tomography in FIG. 5. Therefore, the dielectric sensitive material $Fe_3O_4$ hollow nanospheres embedded in the cured epoxy resin, acted as electromagnetic receptor, can effectively perform the energy conversion process and continuously degrade the surrounding epoxy resin from the inside of the bulk $Fe_3O_4$-ER composites, which cause the expansion of hollow cavities.

Figure 6:
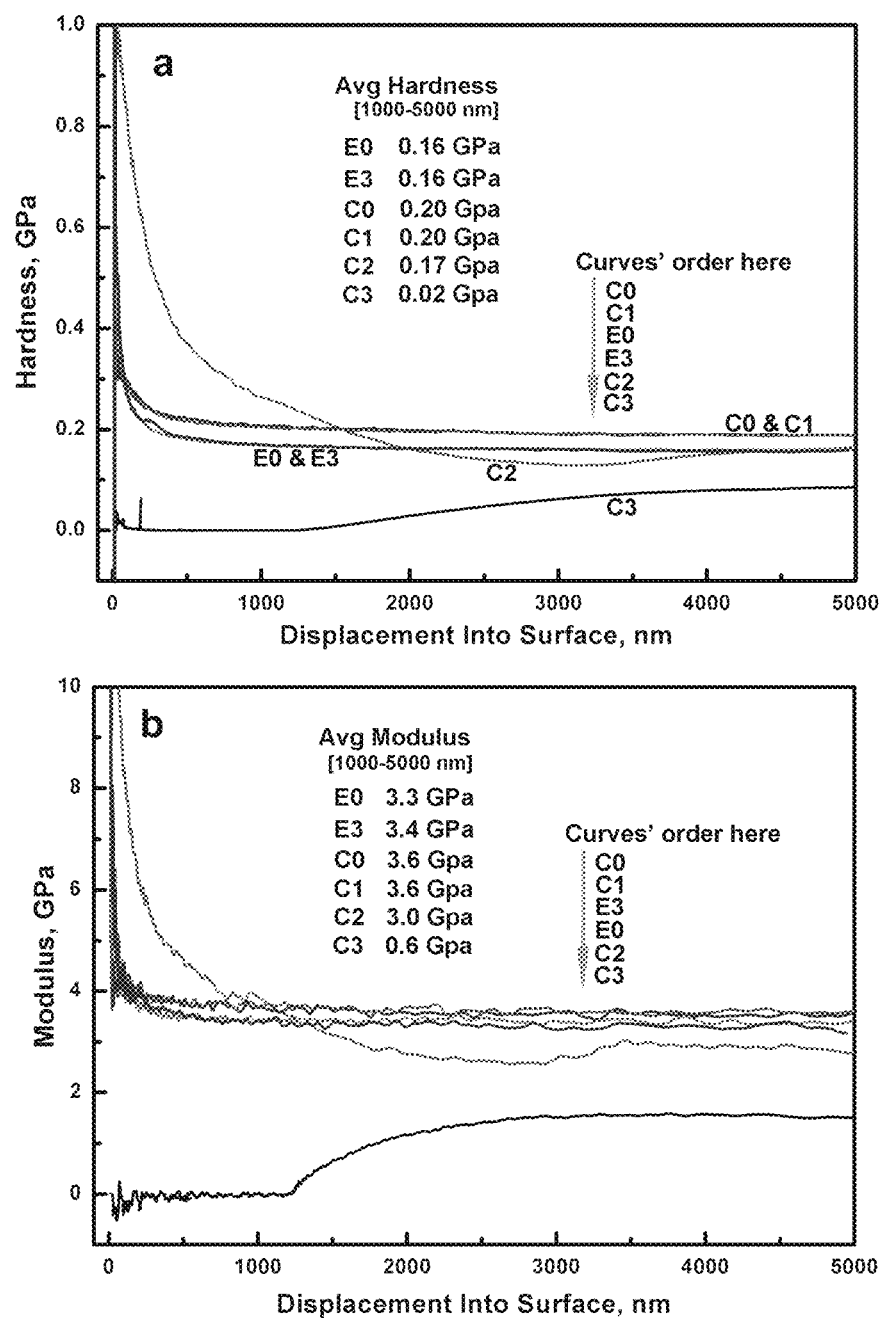
FIG. 6 shows the hardness and modulus as a function of depth for indentations into various cured Fe3O4-ER composites or pure epoxy resin with different dielectric heating times.

FIG. 6 shows the hardness and modulus as a function of depth (0-5000 nm) for indentations into various cured $Fe_3O_4$—ER composites (or pure epoxy resin) with different dielectric heating times, which were labelled as E0, E3, C0, C1, C2 and C3. The average hardness and modulus (1000-5000 nm) of indentation into pure epoxy resin (E0) are 0.16 and 3.3 GPa, respectively. After the microwave irradiation for 3 mins, the average hardness and modulus of pure epoxy resin (E3) maintained the almost same results, which are 0.16 and 3.4 GPa, respectively, indicating that the pure epoxy resin has no obvious degradation in 3 mins of microwave irradiation. The average hardness and modulus (1000-5000 nm) of indentation into the composites (1 wt % $Fe_3O_4$ HNSs dispersed into epoxy resin, labelled as C0) are 0.20 and 3.6 GPa, signifying that the strength and stiffness of epoxy resin are improved by the embedding of $Fe_3O_4$ HNSs. The strength and stiffness of $Fe_3O_4$-ER composites are maintained in the same performance after dielectric heating for 1 min (C1) and then decreased over dielectric heating time from 1 to 3 mins. The average hardness and modulus (1000-5000 nm) of indentation into the $Fe_3O_4$-ER composites obtained after 2 mins microwave irradiation (C2, as shown in the FIG. 6) are 0.17 and 3.0 GPa, probably due to the formation of degraded cavities with the micro size greater than the that of $Fe_3O_4$ hollows spheres shown in f of FIG. 3. The average hardness and modulus (1000-5000 nm) of indentation into the sample C3 (FIG. 6) are severely decreased into only 0.02 and 0.6 GPa, indicating that the $Fe_3O_4$-ER composites are badly damaged by the dielectric heating.

Figure 6B:
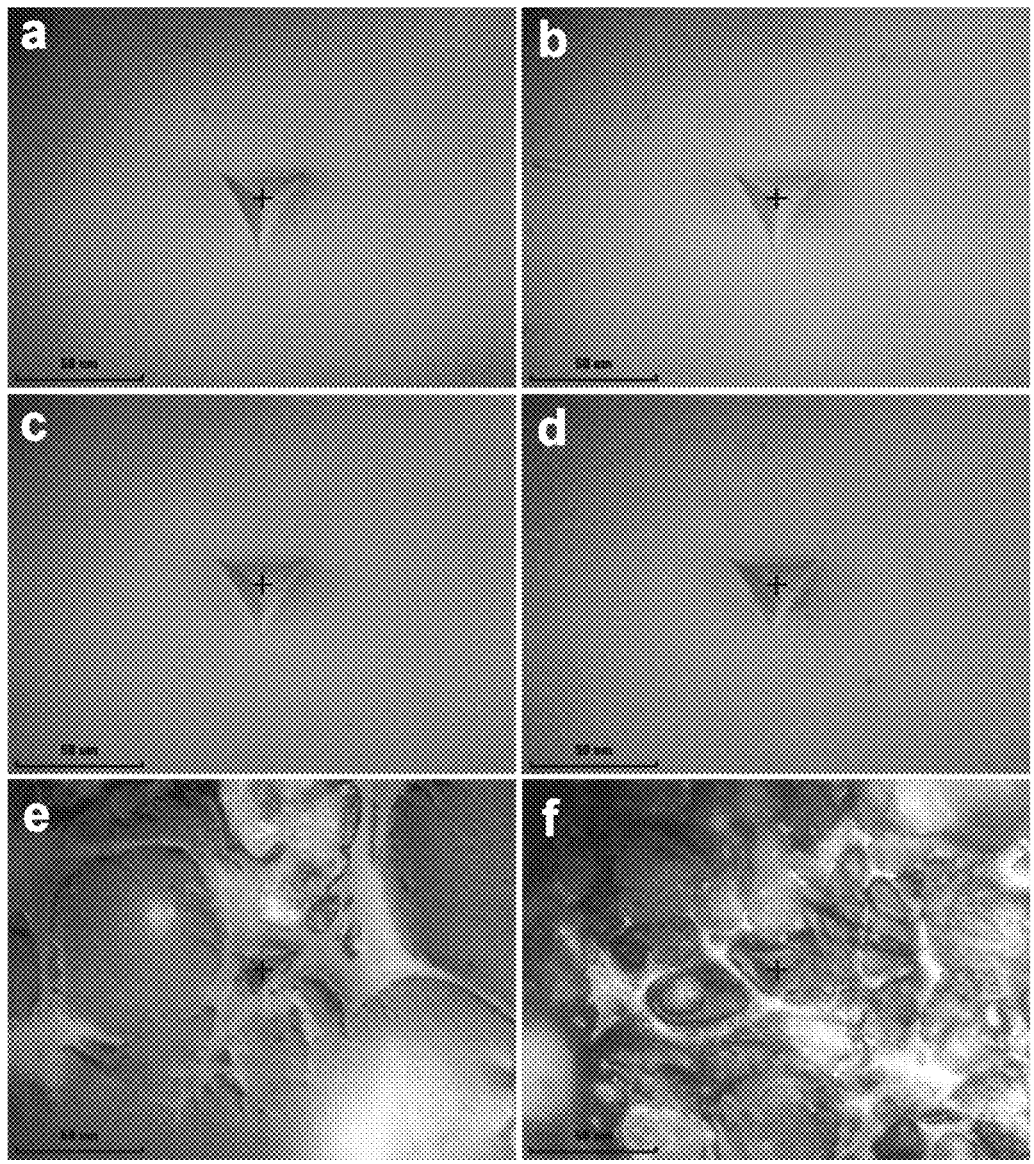
FIG. 6B shows photomicrographs of nano-indentation sites.

The corresponding nano-indentation sites are shown in FIG. 6B. The corresponding nanoindentation sites for pure epoxy resin exhibit the smooth flatten surface with little damage before and after dielectric heating. The relevant nanoindentation sites for $Fe_3O_4$-ER composites present the damaged surfaces that deteriorate over dielectric heating time from 0 to 3 mins. The indentation results correspond well with the FESEM and 3D X-ray microscopy results above. The greater hollow cavities further merged with each other to form sponge-like hollow network structure, which severely damaged the $Fe_3O_4$-ER composites' strength and stiffness.

Tensile Shear Test

The $Fe_3O_4$-ER composites (or pure epoxy resin as comparison) were used for bonding single-lap-shear (SLS) joints in order to test the tensile shear strength of the joins formed by the composites. The substrates are high stable epoxy plastic slides (60 mm×25.4 mm×2 mm) with no surface coating. 0.63 ml of uncured $Fe_3O_4$-ER composites (or pure epoxy resin) was used for bonding the joints with area of 25.4 mm×25.4 mm. The total length of the bonded joints is 94.6 mm. Such customized dimension of SLS specimens is designed for matching the cavity size of microwave reactor in order to further investigate the degradation behaviour by dielectric heating. Then the cured joints were exposed under single-mode microwave irradiation at fixed power of 100 W and frequency at 2.45 GHz for 0-3 min.

A universal tensile machine (UTM, Tinius Olsen H25KS) was used to carry out the tensile shear tests at room temperature. In order to ensure that the loading direction was parallel to the bond-line, two compensation spacers were bonded with the SLS specimens after microwave irradiation. The crosshead velocity was set at a constant velocity of 2 mm/min.

Figure 7:
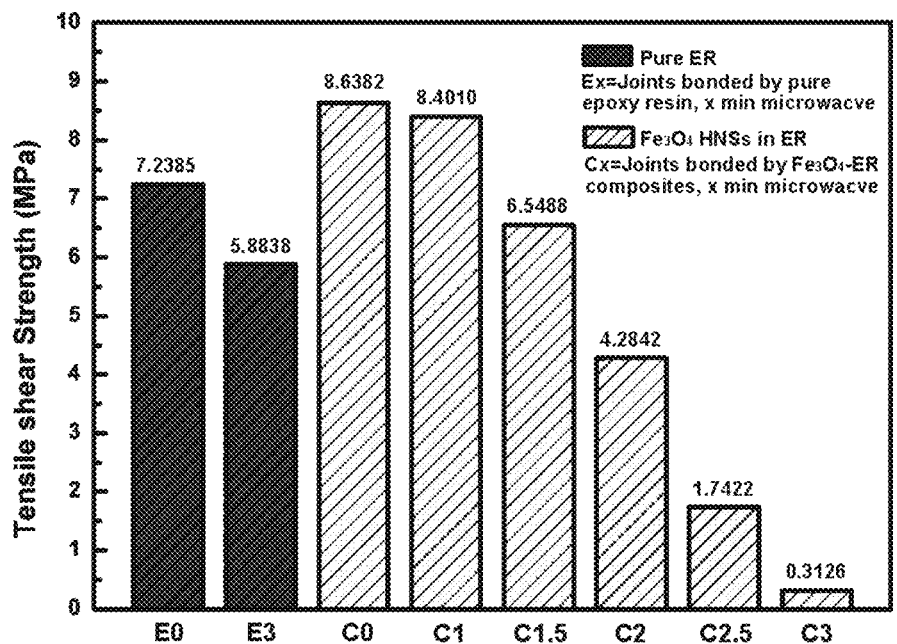
FIG. 7 is a graph of tensile shear strength of SLS joints affected by microwave irradiation time.

FIG. 7 shows the tensile shear strength of the SLS joints affected by the microwave irradiation time. The tensile shear strength (MPa, at the failure point) of the SLS joints is increased from 7.2385 (JE0) to 8.6382 MPa (JC0), when the adhesive of pure epoxy resin is supplanted by $Fe_3O_4$-ER composites, probably due to the $Fe_3O_4$ hollow nanospheres uniformly dispersed in the epoxy resin acting as reinforcing filler. After 3 mins microwave irradiation, the SLS joints bonded by pure epoxy resin still show tensile shear strength of 5.8838 MPa (JE3), showing that the decreasing of bonding properties for joints is inefficient in this case. The tensile shear strength of SLS joints bonded by $Fe_3O_4$-ER composites is rapidly decreased after 1.5 mins microwave irradiation (FIG. 7), and decreased from 8.6382 (JC0) to 0.3126 Mpa (JC3), a decrease of 96.3% after 3 mins microwave irradiation, indicating that the bonding strength of SLS joints bonded by $Fe_3O_4$-ER composites is overwhelmingly weakened by dielectric heating.

These results show that by embedding $Fe_3O_4$ hollow nanospheres in epoxy resin, degradation of cured epoxy resin can be achieved by dielectric heating. FESEM and 3D X-ray microscopy results indicated that the dielectric sensitive material $Fe_3O_4$ hollow nanospheres, which were well dispersed in the cured epoxy resin, can effectively convert the microwave energy into thermal energy as the electromagnetic acceptor, and consequently heat and degrade the surrounding epoxy resin. Nanoindentation results also confirmed that the average hardness and modulus of $Fe_3O_4$-ER composites were decreased over dielectric heating time and they were severely decreased between 2 and 3 mins microwave irradiation, accompanied by the considerable morphological evolution as well as the swift expansion of hollow cavities from several to dozens of microns and consequently to sponge-like 3D porous architectures. The tensile shear strength of the single lap-shear (SLS) joints bonded by $Fe_3O_4$-ER composites exhibited a significant loss caused by dielectric heating, compared to that bonded by pure epoxy resin.

EXAMPLE 5—MODIFIED CARBON NANOFIBRES/NANORODS

Materials

Carbon nanofibres (CNFs, diameter ~130 nm, length 20-200 μm), (3-Glycidyloxypropyl) trimethoxysilane (98%) employed as silane coupling agent (SCA), Sulfuric acid (H2SO4, ACS reagent, 95.0-98.0%), Nitric acid ($HNO_3$, ACS reagent, 70%), epoxy embedding medium kit including epoxy embedding medium (epoxy prepolymer), hardener MNA, hardener DDSA and accelerator DMP 30 are purchased from Sigma-Aldrich.

Synthesis

The surface oxidation of CNFs was carried out as follows. 0.5 g of CNFs was dispersed into mixed acid with 30 ml $H_2$504 and 10 ml $HNO_3$ in a 100 mL round bottom flask. The dispersion was first stirred using a vortex mixer (Vortex Gene 3) for about 1 min, and then was put in a laboratory ultrasonic bath (37 kHz) for 10 min at room temperature. This mixing and dispersion process was repeated twice to break big CNFs aggregates. Then the dispersion was refluxed at 60° C. (also at 40 or 80° C.) for 2 hours with magnetic stirring. After the surface treatment, the CNFs were separated by filtration and washed with deionized water for several times until the pH=7. Then the CNFs were dried in a vacuum oven at 60° C. for 24 hours. The oxidized CNFs at 60° C. were denoted as o-CNFs.

0.03 g of SCA (3-Glycidyloxypropyl) trimethoxysilane was added into 15 g epoxy prepolymer in a 100 mL flask and stirred using a vortex mixer for about 1 min. Then 0.3 g of o-CNFs was added and dispersed in via sonication at 60° C. for 30 mins, and then stirred using a vortex mixer for about 1 min again. This sonication and vortex stirring process was repeated 3 times. Then 7.4 g hardener MNA and 7.3 g hardener DDSA were added into the dispersion via vortex mixing for 1 min followed by sonication at 30° C. for 30 mins. This was repeated 3 times in turn again. Consequently the dispersion was magnetically stirred at room temperature for 3 days in order to get a uniform dispersion. The total weight of the dispersion is about 30 g so that the weight proportion of o-CNFs is about 1.0 wt %.

In the curing procedure, 15 drops of accelerator DMP 30 were added into the uniform dispersion via vortex mixing for 1 min followed by sonication at 30° C. for 10 mins, and repeated 3 times in turn. The resultant nCEA was then applied to quartz slides and cured in a vacuum oven at 60° C. for 3 days. The cured nanocomposite sheet (25.4 mm×25.4 mm×1 mm) was obtained for analysis and dielectric degradation in single mode microwave reactor CEM Discover SP (100 w, 2.45 GHz) with an infrared (IR) Temperature Sensor. For comparison, the pure epoxy adhesive sheet was also prepared using the same curing procedure.

The resultant nCEA was also applied for bonding the joints and then cured in a vacuum oven at 60° C. for 3 days. The adhesive bonded joints with a bond area of 25.4 mm×25.4 mm were obtained.

Characterisation

Raman Spectrum was performed on a Dilor XY Labram spectrometer using a 532 nm ArHe green laser. Spectra were collected in the range of 1700-1200 $cm^{-1}$. FESEM was performed using a Hitachi SU-70 system at accelerating voltages of 10-20 kV equipped with an energy dispersive X-ray spectroscopy (EDX). Transmission electron microscopy (TEM) was performed using a JEOL JEM 2100F field emission microscope.

Sliced thin sections of cured nCEA with the thickness of about 100 nm, prepared by ultramicrotomy using a Leica UCT machine, were used for corresponding TEM characterisation. 3D X-ray microscopy (XRM) was performed using VersaXRM-500 employing a high-energy X-ray source (80 kV).

The hardness and modulus of the cured nanocomposites (or pure epoxy adhesive), obtained before and after microwave irradiation, were characterised by nanoindentation using the Nanoindenter G200 developed by Agilent Technologies under Continuous Stiffness Measurement (CSM) technique.

A universal tensile machine (UTM, Tinius Olsen H25KS) was used to carry out tensile shear tests at room temperature. The substrates were highly stable epoxy plastic slides (60 mm×25.4 mm×2 mm) with no surface coating. The total length of the bonded joints was 94.6 mm. These customised dimensions were chosen to be as close as possible to standardised adhesive joints tests, but modified so that the joints could fit in the cavity of the microwave reactor for subsequent dielectric heating.

The cured adhesive joints were exposed under single-mode microwave irradiation at fixed power of 100 w and frequency at 2.45 GHz for 0-50 s. In order to ensure that the loading direction was paralleled to the bond-line, two compensation spacers were bonded with the SLS specimens after microwave irradiation. The crosshead velocity was set at a constant velocity of 2 mm/min.

Results and Discussion

Figure 8:
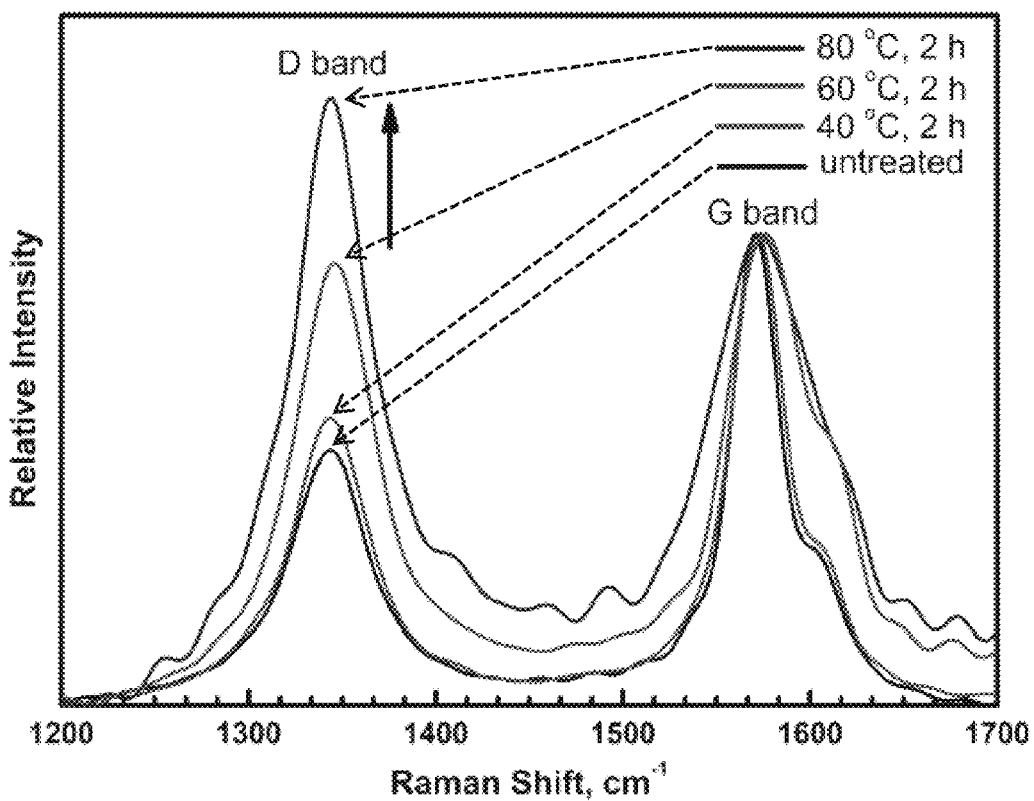
FIG. 8 shows Raman bands of untreated CNFs and o-CNFs obtained at different temperatures.

FIG. 8 shows Raman bands of untreated CNFs (a) and o-CNFs treated at 40 (b), 60 (c) or 80 (d) ° C.

FIG. 8 shows the Raman spectra of the untreated CNFs and o-CNFs obtained under different temperatures. The most pronounced Raman signatures of graphite-based CNFs are collectively known as the G around 1560-1600 $cm^{-1}$ and D bands around 1350 $cm^{-1}$, corresponding to the $sp^{2-}$ and $sp^{3-}$ hybridized carbons. Oxidation process resulting from acid treatment introduces $sp^3$ centres and other structural defects, which give rise to the intensity of D band. The integrated ratio of D/G bands indicates the degree of surface oxidized functionalization of CNFs. In examining this, the G band of each sample was tuned to exhibit the relative Raman D-to-G band intensities in FIG. 8, which were comparable to clearly signify the enhancement of D band intensity by increasing the treated temperature. A sample of o-CNFs obtained under 40° C. does not show obvious rise of D/G ratio, then the D/G ratio is considerably increased under acid treatment at 60° C., indicating that the surface of CNFs were functionalized with —C═O, —C—O—C—, —COO—, and —C—OH groups with a relative high density. Acid treatment at 80° C. can extremely further enhance the D/G ratio, but unfortunately the o-CNFs obtained at 80° C. showed poor dielectric (microwave) heating performance.

Figure 9:
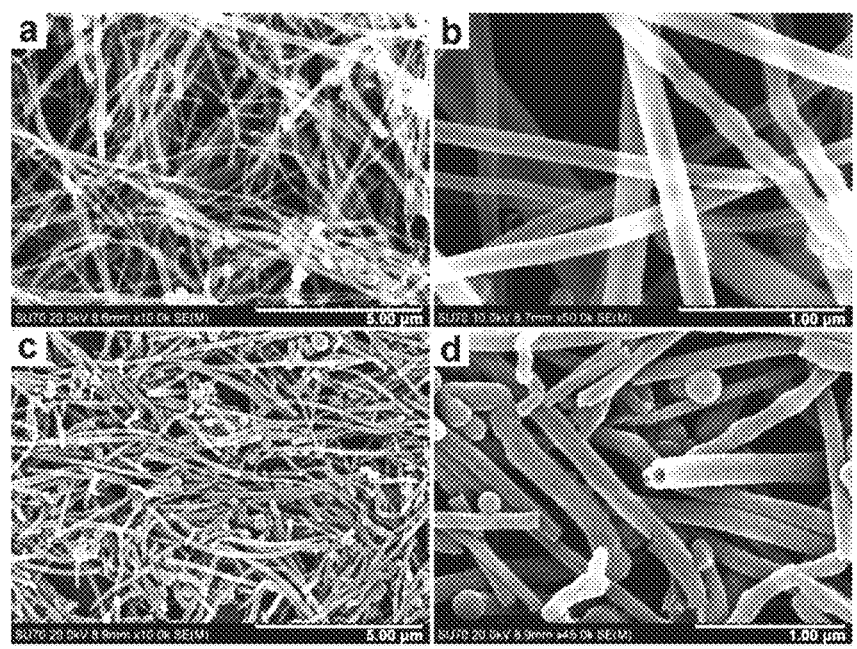
FIG. 9 shows FESEM images of untreated CNFs (panels a and b) and o-CNFs (panels c and d).

FIG. 9 shows FESEM images of untreated CNFs (a & b) and o-CNFs treated at 60° C. (c & d).

The FESEM image of untreated CNFs shown in FIG. 9a exhibits an amount of the nanofibres are intricately intertwined with each other, revealing that embedding them mono-dispersed in epoxy adhesive is challenging. The length of CNFs is more than 10 μm and their diameter shown in FIG. 9b is about 100-200 nm, with smooth surface. After treated in mix acids at 60° C., the orderliness of the fibres has been much improved, the results of which are shown in FIG. 9c. The length of o-CNFs is still more than 5 μm. FIG. 9d shows fibres' diameter maintains the same size comparing with the untreated CNFs, but the surface of o-CNFs is scratched due to the acid treatment.

FESEM images showed the length and surface of o-CNFs obtained at 40° C. have no obvious change morphologically (not shown). The fibres with smooth surface are still tangled with each other. While the o-CNFs obtained at 80° C. (not shown) were severely trimmed by acid corrosion and oxidation. The surface of CNFs was overwhelmingly damaged into the distorted short rods, aggregated with each other.

Figure 10:
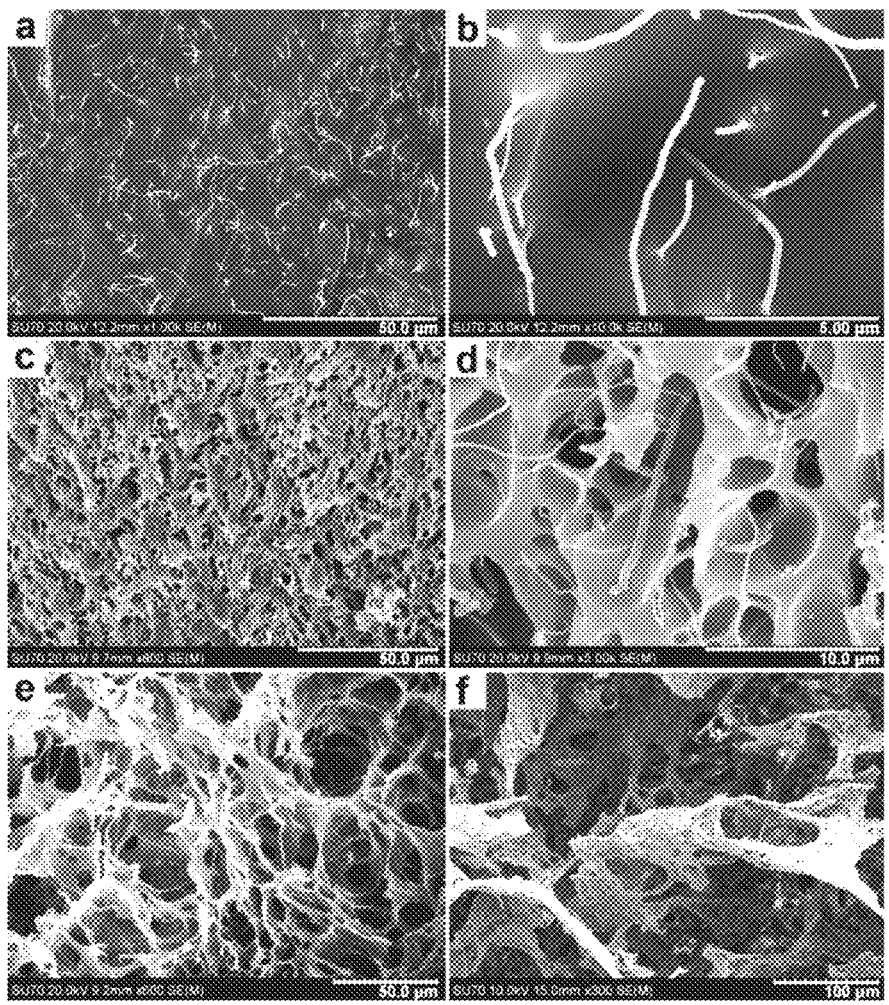
FIG. 10 shows FESEM images of the section fracture of cured nCEA sheet before microwave irradiation (panels a and b), after single-mode microwave irradiation for 40 s (panels c and d), 50 s (panel e) and 60 s (panel f).

FIG. 10 shows FESEM images of the section facture of cured nCEA sheet before microwave irradiation (a, b), after single-mode microwave irradiation at 100 w for 40 (c, d), 50 (e) and 60 s (f).

The nanocomposite epoxy adhesive (nCEA), was applied onto the quartz slides, obtained in the typical procedure, was employed to evaluate the dielectric heating performance as well as the degradation of nCEA under single mode microwave over irradiation time. FIGS. 10a and b show the nCEA obtained in the typical procedure, revealing that the monodispersed CNFs are spread throughout the epoxy substrate with even distribution, and every single carbon nanofibre is clearly seen in the FIG. 10b, indicating the successful surface modification the o-CNFs and the functionalization of silane coupling agent in the typical procedure.

Interestingly, FESEM image of FIG. 10c shows the degradation of nCEA after 40 s' microwave irradiation, indicating that numerous void cavities highly dispersed over the section surface are generated surrounding the o-CNFs with the size of about 5 μm. A magnified image in FIG. 10d clearly show that the degraded cavities are actually void tunnels with the corresponding shape to the CNFs located inside, suggesting that the dielectric heating degradation commenced from the border between o-CNFs and epoxy substrate. A similar result was also obtained in the untreated CNFs dispersed in epoxy although with low dispersibility, indicating that the CNFs (neither SCA nor functionalized oxide groups on the surface of o-CNFs) absorbed the microwave energy and converted it into heat, in order to further significantly degrade the composition of epoxy polymers surrounding the fibres. As shown in FIG. 10e the morphology of nCEA was significantly altered after 50 s' microwave exposure resulting in a sponge-like fully voided hollow networked structure. The architecture of nCEA was overwhelmingly destroyed after 60 s' microwave exposure as shown in FIG. 10f indicating that only a few of isolated ash pieces left.

Figure 11:
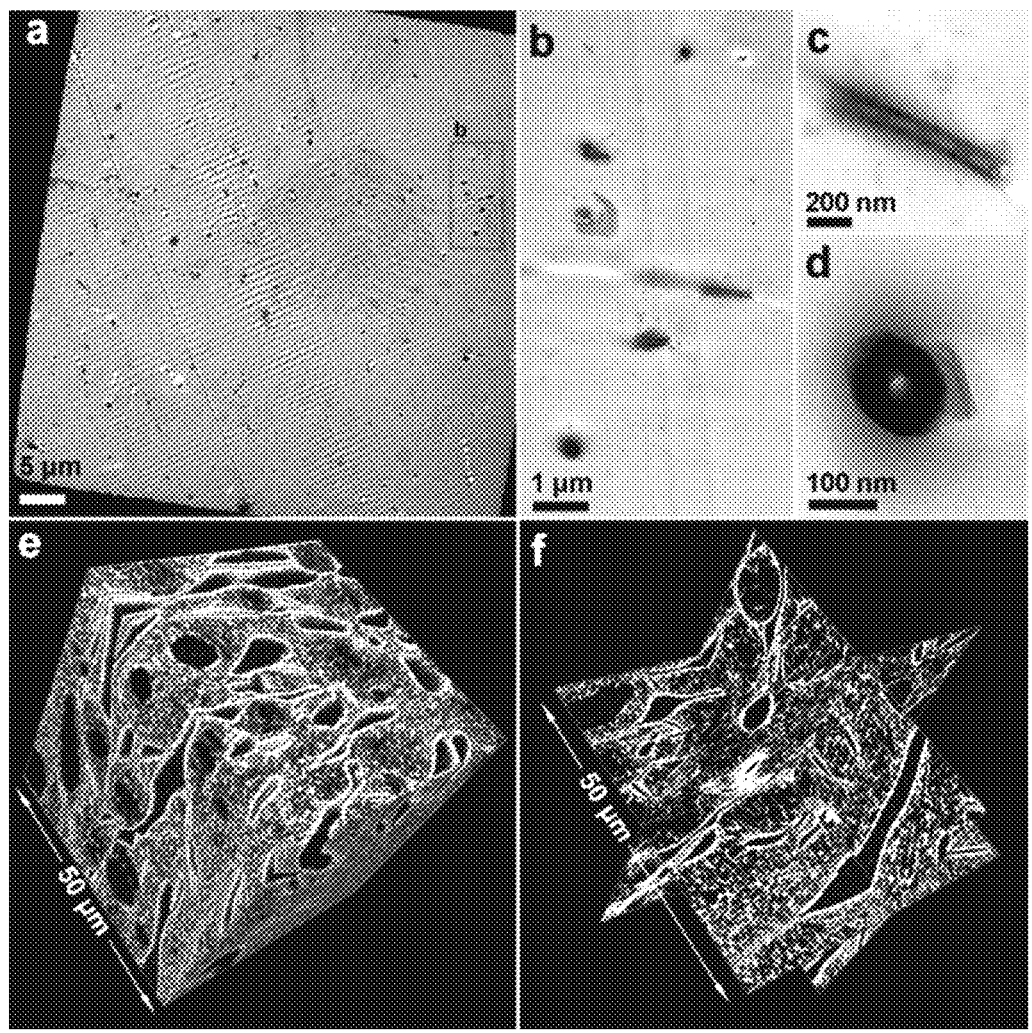
FIG. 11 shows TEM images of ultra-microtomed thin cut of nCEA in global view (panel a), magnified (panels b-d), 3D X-ray computed tomography of cured nCEA under single-mode microwave irradiation for 40 s (panel e), and the corresponding orthoslice (panel f).

FIG. 11 shows TEM images of ultra-microtomed thin cut of nCEA in global view (a) and the magnified areas (b-d); 3D X-ray computed tomography of cured nCEA under single-mode microwave irradiation at 100 w for 40 s (e) and the corresponding orthoslice (f).

FIG. 11a shows a global view of ultra-microtomed thin cut of nCEA, signifying that the cut o-CNFs are dispersed in the epoxy matrix evenly. A magnified area shown in FIG. 11b indicates the anisotropic o-CNFs are fully enwrapped with epoxy substrate. Typical images shown in FIGS. 11c and d give typical images for the tubular morphologies of carbon nanofibres dispersed paralleled or perpendicularly into the epoxy thin slice.

FIG. 11e exhibits the 3D X-ray computed tomography (3D micro-CT) for the nCEA after 40 s' microwave irradiation, and the where the FIG. 11f is the corresponding orthoslice. The internal configuration in three spatial dimensions indicates that the anisotropic void tunnels run through the inside of bulk epoxy matrix, and the epoxy substrates are severely damaged after the microwave irradiation. It is noticed that the o-CNFs can not be distinguished from the epoxy substrate from 3D micro-CT, probably because carbon is the main element for both o-CNFs and epoxy substrate, so that it is very difficult to differentiate the o-CNFs by X-ray if a high dispersibility is achieved.

Ultra-microtome and 3D Micro-CT results re-confirmed the achievement of monodispersed o-CNFs in epoxy adhesive, resulting in the uniformly distributed degradation. It can thus be concluded that the dielectric sensitive material o-CNFs acted as outstandingly effective electromagnetic receptors that converted the dielectric energy into heat in the epoxy matrix and degrading it over time resulting in the formation of hollow cavities (tunnels).

Figure 12:
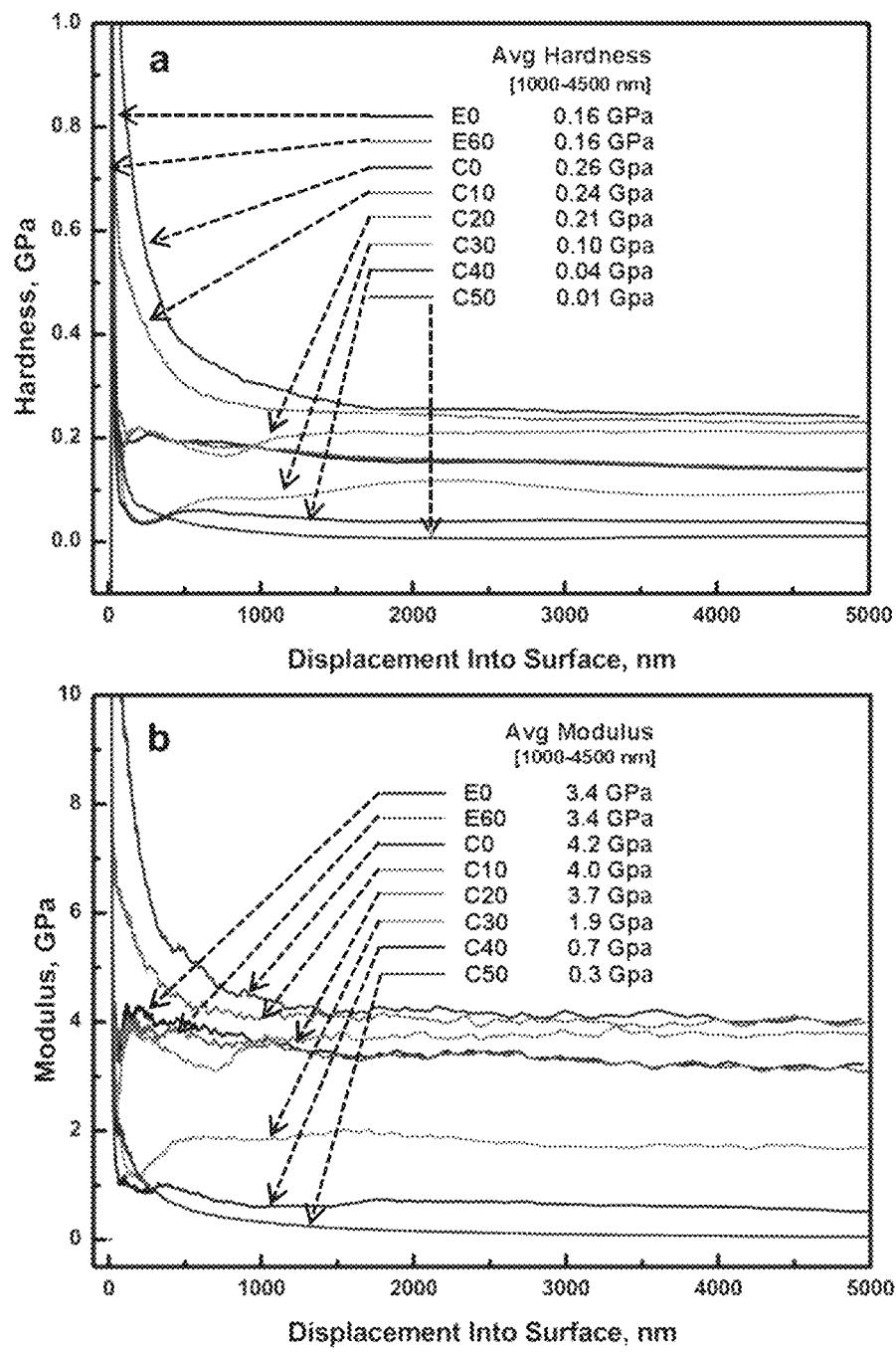
FIG. 12 shows the hardness (panel a) and modulus (panel b) as a function of depth for indentations into cured nCEA and pure epoxy adhesive with different dielectric heating times.

FIG. 12 shows the hardness (a) and modulus (b) as a function of depth for indentations into cured nCEA and pure epoxy adhesive with different dielectric heating time. Ex=Pure epoxy resin (blank sample) for x seconds dielectric heating. Cx=nCEA for x seconds dielectric heating.

In order to test the applicability of the developed nCEA as a "reworkable adhesive", a series of mechanical characterisation tests were performed before and after microwave irradiation. FIG. 12 shows nanoindentation hardness and modulus measurements as a function of depth (0-5000 nm), using the Continuous Stiffness Measurement (CSM) technique for cured pure epoxy resins (E0, E60) and nanocomposite adhesive (C0-050) with different dielectric heating time.

The indentation data is very noisy for the first 1000 nm of indentation depth due to the surface roughness on the samples and low load levels, and so average data over indentation depths of 1000-4500 nm is used as it has essentially converged. The average hardness and modulus values for pure epoxy resin with no irradiation exposure (E0) are 0.16 GPa and 3.4 GPa, respectively. After 3 mins' microwave irradiation it (E60) keeps the same average hardness and modulus results, indicating that no obvious degradation of mechanical properties has occurred. The average hardness and modulus values for the non-irradiated nCEA (C0) are 0.26 and 4.2 GPa, respectively, signifying significant improvements over the pure epoxy case by 62.5% and 23.5%, respectively. These properties were maintained for up to 20 s of dielectric heating exposure (C10 and C20), during which the hardness values are slightly decreased via 0.26(0s)-0.24(10s)-0.21(20s) GPa, and the modulus values are also slightly decreased via 4.2(0s)-4.0 (10s)-3.7(20s) GPa. However, after this point the properties were observed to decrease rapidly, with hardness reduced to 0.10 GPa and modulus to 1.9 GPa at 30 s' exposure time (C30), probably owing to the substantial degradation starting around 30s as the nCEA's temperature reaches to 230° C. The properties of nCEA is still reduced rapidly from 30 to 40s and the hardness and modulus values for the nCEA at 40 s (C40) are 0.04 and 0.7 GPa, respectively. The most likely cause of this is the formation of void tunnels with the size of 5-10 μm shown in FIG. 10d. After 50 s' exposure (C50), the hardness and modulus were severely decreased by 96.2% and 92.9% to only 0.01 GPa and 0.3 GPa, respectively, indicating that the nanocomposite adhesive was almost completely degraded by the dielectric heating.

Figure 13:
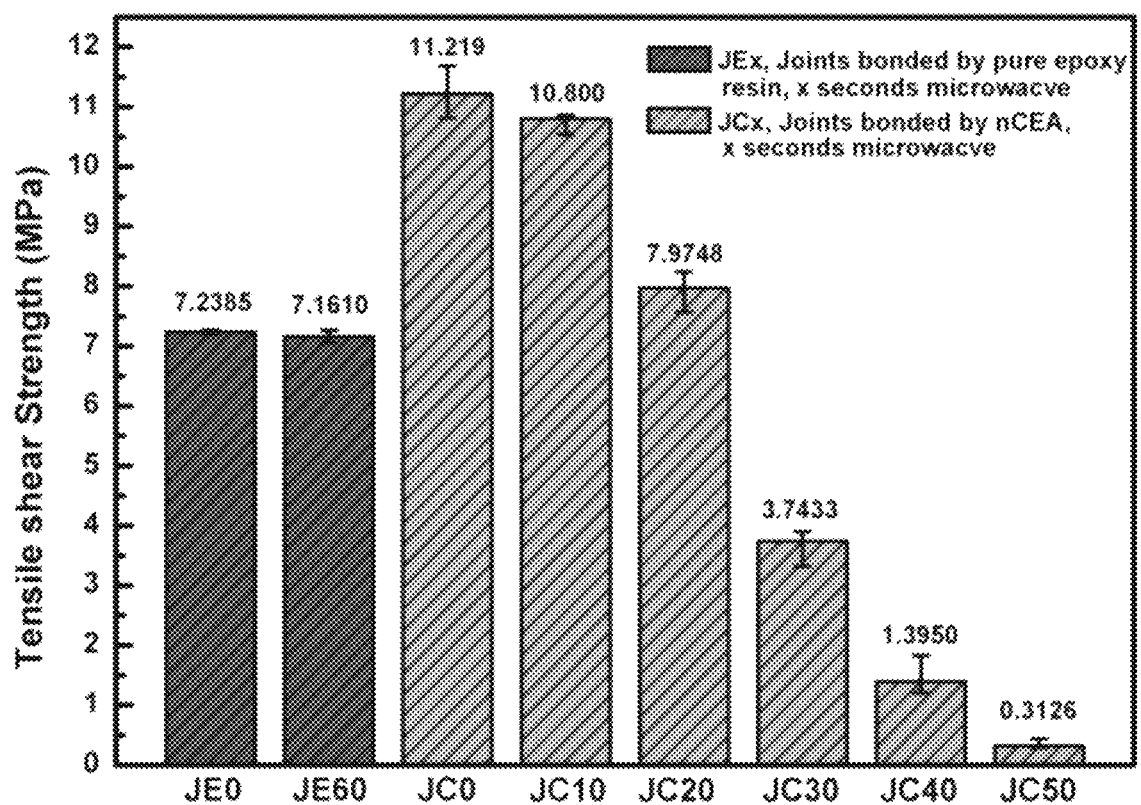
FIG. 13 shows the tensile shear strength of adhesively-bonded single lap-shear (SLS) joints as a function of microwave irradiation time.

FIG. 13 shows the tensile shear strength of the adhesively-bonded single lap-shear (SLS) joints as a function of microwave irradiation time at 100 w, 2.45 GHz.

The degradation in mechanical properties when the nanocomposite adhesives are used in bonded joint applications was tested and the results are shown in FIG. 13. FIG. 13 shows the ultimate strength of single-lap shear (SLS) tension loaded joints bonded by either pure epoxy adhesives (JE0, JE60) or nCEA (JC0-JC50) at increasing microwave irradiation times (the number corresponds to time in second). The ultimate joint strength (MPa, at the failure point) of the SLS joints is increased from 7.24 MPa (JE0) to 11.22 MPa (JC0) by the addition of 1.0 wt % o-CNFs into the bonding epoxy adhesive, giving a adhesion rise of about 55.0%, possibly due to a toughening/reinforcing mechanism observed by introducing 1D nanomaterials into epoxy adhesives. The strength of the SLS joints bonded by the pure epoxy adhesive shows little decrease after 60 s' microwave irradiation (JE60), demonstrating that microwave irradiation is not sufficient alone to disassemble these bonded joints. The strength of SLS joints bonded by nCEA remains almost constant up to 10 s' microwave exposure (JC0-JC10). After this point the joint strength decreases linearly (JC10-JC50) and at 50 seconds of exposure time it is decreased by 97.2% to 0.31 MPa. This significant decrease in strength indicates that the bonding strength is overwhelmingly weakened by the application of dielectric heating, to the point that application of any further mechanical load (even low hand pressure) completely de-bonded the bonded components.

CONCLUSIONS

These results show that a reworkable nano-composite based adhesive can be prepared by embedding the modified carbon nanofibres (o-CNFs) as the dielectric sensitive nanomaterials in epoxy adhesive. The dispersibility of CNFs in epoxy adhesive was highly improved by the surface oxidation and silane coupling agent, so that the developed nanocomposite epoxy adhesive (nCEA) was highly sensitive to dielectric heating resulting in significant degradation of mechanical properties after an exposure time of less than 50 seconds. The dielectric heating performance of composite adhesive was investigated by microwave irradiation in fixed power over time. FESEM and 3D Micro-CT results indicated that the dielectric sensitive material o-CNFs were monodispersed in the cured epoxy adhesive and acted as electromagnetic receptors to effectively convert the microwave energy into thermal energy to significantly degrade the modulus and hardness by 96.2% and 92.9%, respectively, as a result of generating and growing of void tunnels in the adhesive surrounding the o-CNFs. Before exposure to dielectric heating, tensile loaded SLS joints bonded by nCEA were in fact 55.0% stronger than those bonded using just pure epoxy adhesive. After 50 seconds of dielectric heating exposure, the strength of nCEA joints reduced by 97.2%, thus demonstrating the excellent re-workable performance of our new composite adhesive.

In summary, the present invention provides an adhesive composition degradable by dielectric heating. The adhesive composition comprises a thermosetting polymer and a material sensitive to dielectric heating. The material sensitive to dielectric heating is selected from any one or more of hollow nanospheres, nanotubes, nanorods, nanofibres, nanosheets, graphene, graphene derivatives, nano/micro hybrids and mixtures of two or more nanoscale particles. The adhesive composition may be particularly useful in the assembly and disassembly of parts, particularly parts which have complicated and/or blocked joined surfaces. A method of joining at least two parts of an article together and a method of disassembling at least two parts of an article, using the adhesive composition are also provided. The adhesive composition may provide a reworkable nano-composite adhesive. The adhesive composition may be used to reversibly bond a biomedical or dental implant to a part of a human or animal body.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A method of disassembling at least two parts of an article which are joined by a cured adhesive composition comprising a thermoset polymer and particles susceptible to dielectric heating, the method comprising the steps of:
   i) exposing the cured adhesive composition to electromagnetic energy having a frequency in the range of from 10 MHz to 20 GHz to heat the particles susceptible to dielectric heating comprised within the cured adhesive composition; and
   ii) separating the at least two parts of the article from each other, wherein the particles susceptible to dielectric heating are selected from any one or more of hollow nanospheres, nanotubes, nanorods, nanofibres, nanosheets, graphene, graphene derivatives, nano/micro hybrids and mixtures of two or more nanoscale particles; and
   wherein the cured adhesive composition is produced by curing an adhesive composition comprising a thermosetting resin in an amount of at least 15 wt % and the particles susceptible to dielectric heating in an amount of from 0.01 wt % to 10 wt %.

2. The method according to claim 1, wherein the electromagnetic radiation has a frequency of from 10 MHz to 50 MHz.

3. The method according to claim 1, wherein the electromagnetic radiation has a frequency of from 800 MHz to 5 GHz.

* * * * *